(12) United States Patent
Masud

(10) Patent No.: US 12,045,224 B2
(45) Date of Patent: Jul. 23, 2024

(54) METHODS FOR SELF-AWARE, SELF-HEALING, AND SELF-DEFENDING DATA

(71) Applicant: s â f.ai, Inc., Potomac, MD (US)

(72) Inventor: Ahmed Masud, Potomac, MD (US)

(73) Assignee: s â f.ai, Inc., Potomac, MD (US)

( * ) Notice: Subject to any disclaimer, the term of this patent is extended or adjusted under 35 U.S.C. 154(b) by 1001 days.

(21) Appl. No.: 16/747,359

(22) Filed: Jan. 20, 2020

(65) Prior Publication Data

US 2020/0233855 A1 Jul. 23, 2020

Related U.S. Application Data

(60) Provisional application No. 62/794,922, filed on Jan. 21, 2019.

(51) Int. Cl.
| | |
|---|---|
| *G06N 3/08* | (2023.01) |
| *G06F 16/23* | (2019.01) |
| *G06N 3/045* | (2023.01) |
| *G06N 3/06* | (2006.01) |
| *G06N 7/02* | (2006.01) |
| *G06N 7/04* | (2006.01) |

(52) U.S. Cl.
CPC ......... *G06F 16/2365* (2019.01); *G06N 3/045* (2023.01); *G06N 3/061* (2013.01); *G06N 3/08* (2013.01); *G06N 7/023* (2013.01); *G06N 7/046* (2013.01)

(58) Field of Classification Search
CPC .. G06F 16/2365; G06N 3/0454; G06N 3/061; G06N 3/08; G06N 7/023; G06N 7/046; G06N 3/0445; G06N 3/082; G06N 3/04

USPC .......................................................... 706/12
See application file for complete search history.

(56) References Cited

U.S. PATENT DOCUMENTS

| | | | | |
|---|---|---|---|---|
| 5,253,328 | A | * 10/1993 | Hartman | G11C 15/00 |
| | | | | 365/49.1 |
| 8,793,205 | B1 | 7/2014 | Fisher et al. | |
| 2006/0133699 | A1 | 6/2006 | Widrow et al. | |
| 2008/0281767 | A1 | 11/2008 | Garner | |
| 2016/0321784 | A1 | 11/2016 | Annapureddy | |
| 2019/0197130 | A1 * | 6/2019 | Huang | H04L 9/50 |
| 2022/0190842 | A1 * | 6/2022 | Wen | G06N 3/08 |

FOREIGN PATENT DOCUMENTS

| | | |
|---|---|---|
| CN | 108 460 058 A | 8/2018 |
| KR | 10-2018-0037558 A | 4/2018 |

OTHER PUBLICATIONS

Serrano, Will. "The random neural network with a BlockChain configuration in digital documentation." International Symposium on Computer and Information Sciences. Springer, Cham, 2018. (Year: 2018).*

(Continued)

*Primary Examiner* — Brian M Smith
(74) *Attorney, Agent, or Firm* — The Marbury Law Group PLLC

(57) ABSTRACT

Various embodiments include methods and devices for transforming a data block into weights for a neural network. Some embodiments may include training a first neural network of a cybernetic engram to reproduce the data block, and replacing the data block in memory with weights used by the first neural network to reproduce the data block.

20 Claims, 11 Drawing Sheets

(56) References Cited

OTHER PUBLICATIONS

Goyal, M. et al., "DeepZip: lossless data compression using recurrent neural networks," downloaded from <arxiv.org/abs/1811.08162> (Nov. 20, 2018) 10 pp. (Year: 2018).*

Bayar, B. et al., "Constrained convolutional neural networks: a new approach towards general purpose image manipulation detection," IEEE Trans. on Information Forensics and Security, vol. 13, No. 11 (Nov. 2018) pp. 2691-2706. (Year: 2018).*

Hsu, D. et al., "Time Series Compression Based on Adaptive Piecewise Recurrent Autoencoder," downloaded from <arxiv.org/abs/1707.07961v2> (Aug. 16, 2017) 10 pp. (Year: 2017).*

International Preliminary Report on Patentability (Chapter 1 of the Patent Cooperation Treaty) and Written Opinion of the International Searching Authority in related International Application No. PCT/US2020/014354 dated Jul. 29, 2021.

International Search Report and the Written Opinion of the International Searching Authority received from the Korean Intellectual Property Office in related Application No. PCT/US2020/014354 dated May 28, 2020.

Clark, et al., "Comparison of a Pipelined "Best Match" Content Addressable Memory With Neural Networks", Proceedings of the International Conference on Neural Networks, San Diego, IEEE, vol. 3, pp. III-411, XP000757532, (Jun. 21-24, 1987).

Supplementary Extended European Search Report received from the European Patent Office in related Application No. EP 20 74 4297 dated Oct. 3, 2022.

Supplementary Extended European Search Report received from the European Patent Office in counterpart Application No. 20744297. 1-1203 / 3915060 PCT/US2020/014354 dated Oct. 11, 2022.

Certificate of Correction for U.S. Pat. No. 5,253,328 dated Oct. 12, 1993.

* cited by examiner

METHODS FOR SELF-AWARE, SELF-HEALING, AND SELF-DEFENDING DATA

RELATED APPLICATIONS

This application claims the benefit of priority to U.S. Provisional Patent Application Ser. No. 62/794,922 entitled "Methods for Self-aware, Self-healing, and Self-defending Data" filed on Jan. 21, 2019. The entire contents of which are incorporated herein by reference.

BACKGROUND

Current cybersecurity products, solutions, and approaches apply defenses external to data that is the subject of the cybersecurity protection. Data protections are generally implemented as layers of protection around the data to defend data from unauthorized access, use, disclosure, disruption, modification, or deletion. Various layers of protection are configured to protect data from specific types of threats and the layers are updated or new layers are added to protect data from threats not protected against by implemented layers.

SUMMARY

Various disclosed embodiments may include apparatuses and methods for transforming a data block into weights for a neural network. Various embodiments may include training a first neural network of a cybernetic engram to reproduce the data block, and replacing the data block in memory with weights used by the first neural network to reproduce the data block.

Some embodiments may further include receiving an operation request for the data block, receiving a key input configured to trigger the first neural network to reproduce the data block, and reproducing the data block using the first neural network, the weights, and the key input in response to receiving the operation request.

Some embodiments may further include reproducing the data block using the first neural network, the weights, and a key input configured to trigger the first neural network to reproduce the data block, resulting in a reproduced data block, and executing an operation of an operation request for the data block on the reproduced data block.

Some embodiments may further include executing verification for the reproduced data block by a second neural network of a cybernetic engram, in which executing an operation of an operation request for the data block on the reproduced data block occurs in response to verification for the reproduced data block.

Some embodiments may further include executing authentication for the reproduced data block by a third neural network of a cybernetic engram, in which executing an operation of an operation request for the data block on the reproduced data block occurs in response to authentication for the reproduced data block.

Some embodiments may further include reproducing the data block using the first neural network, the weights, and a key input configured to trigger the first neural network to reproduce the data block, resulting in a reproduced data block, executing verification for the reproduced data block by a second neural network of a cybernetic engram, retrieving different weights in response to failure to verify the reproduced data block, and reproducing the data block using the first neural network, the different weights, and the key input, resulting in a reproduced data block.

In some embodiments, replacing the data block in memory with weights used by the first neural network to reproduce the data block may include storing the weights to a distributed ledger.

Various embodiments include a computing device having a processor configured to perform operations of any of the methods summarized above. Various aspects include a non-transitory, processor-readable medium on which are stored processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
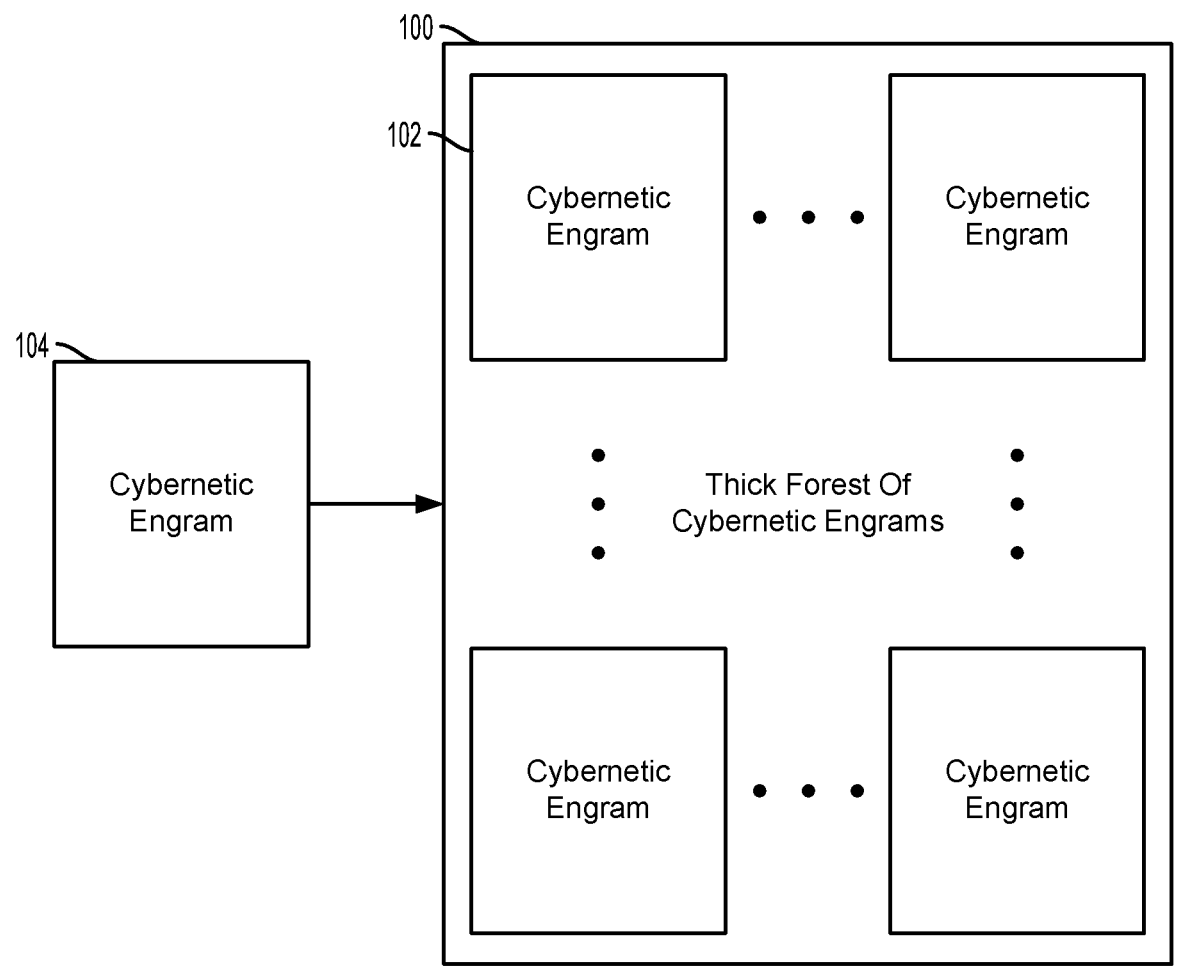
FIG. 1 is a component block diagram illustrating an example self-aware, self-healing, and self-defending data system for implementing various embodiments.

Various embodiments include methods, and computing devices implementing such methods, for fusing data with artificial intelligence to generate self-aware, self-healing and self-defending data. Some embodiments may include a filesystem, a filesystem overlay, and/or a datastore configured to store representations of data as a collection of neural networks, which may be part of what is referred to herein as a CYBERNETIC ENGRAM®. Some embodiments may include the filesystem, the filesystem overlay, and/or the datastore configured to store weights for nodes of the collection of neural networks. In some embodiments, the filesystem, the filesystem overlay, and/or the datastore may be centralized and/or distributed. Some embodiments may include inputting an input key to the collection of neural networks and the collection of neural networks using the related stored weights to reconstruct the data the collection of neural networks represent. Some embodiments may include inputting the input key to the collection of neural networks and the collection of neural networks using the related stored weights to transform, protect, restore, and/or analyze the data. Some embodiments may include the collection of neural networks verifying data updates and allowing or preventing the data updates from occurring. Some embodiments may include the collection of neural networks verifying updated data and restoring data after undesirable data updates.

A filesystem, a filesystem overlay, and/or a datastore may store individual units of data as a collection of neural networks and weights for nodes of the collection of neural networks. For example, an individual block of data may be stored as a collection of neural networks and weights for nodes of the collection of neural networks. In some embodiments, the filesystem, the filesystem overlay, and/or the datastore may be located on any number of transient and/or persistent memory devices of any number of computing devices, such as a single computing device or multiple networked connected computing devices. In some embodiments, the filesystem, the filesystem overlay, and/or the datastore and the weights for the nodes of the collection of neural networks may be stored on the same and/or different memory devices. In some embodiments, the weights for the nodes of the collection of neural networks may stored in a distributed ledger, such as a blockchain.

The collection of neural networks representing each unit of data may implement unsupervised learning of data. A collection of neural networks that learn a unit of data may replace and/or represent the unit of data on a memory device. The collection of neural networks may learn the content of the unit of data and/or metadata associated with the unit of data. In some embodiments, a key input associated with the unit of data may be associated with the stored weights for the unit of data. The collection of neural networks may receive the key input and apply the weights in operations of the collection of neural networks to reconstruct the unit of data. In some embodiments, the collection of neural networks may receive the key input and apply the weights in operations of the collection of neural networks to verify operations on the unit of data, data and/or metadata changes by operations on the unit of data, and/or sources of operations on the unit of data. In some embodiments, the collection of neural networks may receive the key input and apply the weights in operations of the collection of neural networks to verify the data and/or metadata of the unit of data, and use previous weights in operations of the collection of neural networks to restore the unit of data in response to failing to verify the data and/or metadata.

A unit of data may be a part of a combination of multiple units of data, such as a file of data. In some embodiments, a collection of neural networks representing a unit of data may be associated with the combination of multiple units of data. The unit of data reconstructed by the collection of neural networks may be included in the combination of multiple data units. Access operations for the unit of data may trigger execution of the collection of neural networks to access and/or implement operations on the unit of data.

The terms "computing device" are used herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Figure 2:
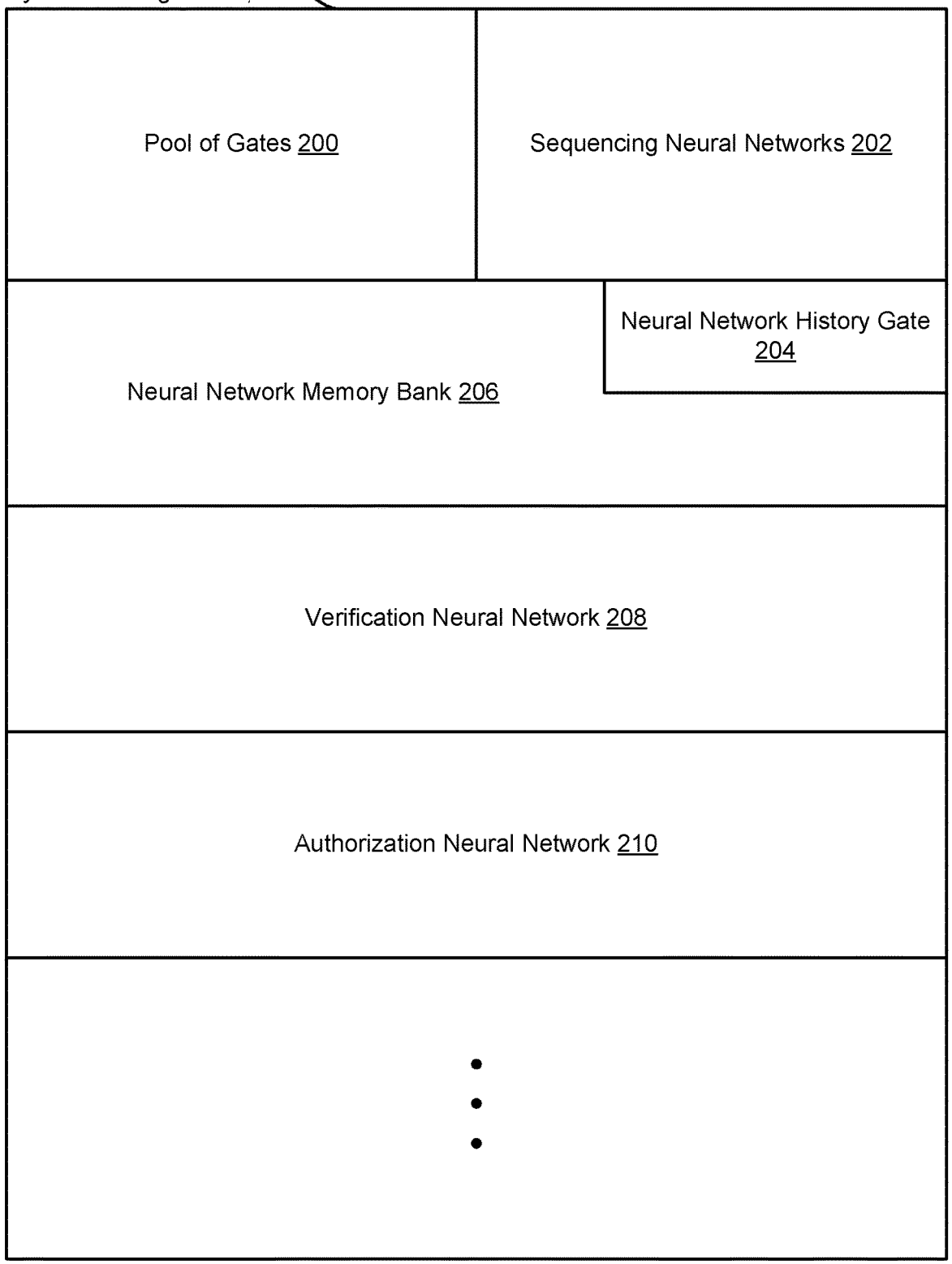
FIG. 2 is a component block diagram illustrating an example CYBERNETIC ENGRAM® for implementing various embodiments.

A collection of more than one CYBERNETIC ENGRAM®, as illustrated in FIGS. 1, 2, 4, and 5, may be implemented as a filesystem, as a data store, and/or as a data block storage device, collectively referred to herein as a data storage system. Each data block may be replaced by a CYBERNETIC ENGRAM®, as illustrated in FIG. 2, including a collection of neural networks and logic gates configured as primitive functions. The collection of neural networks may include any number and combination of various neural networks, such as such as feedforward neural network, a radial basis function neural network, a recurrent neural network, a machine learning forest, etc.

Unlearned data blocks may be learned by a CYBERNETIC ENGRAM® using unsupervised learning by neural networks of the CYBERNETIC ENGRAM®. A learned data block may get replaced by the neural networks of the CYBERNETIC ENGRAM®. The neural networks of the any CYBERNETIC ENGRAM® may be configured for various purposes, such as doing principal component analysis. But, the main function of any CYBERNETIC ENGRAM® may be transforming some special type of input into a learned block of data. So, a CYBERNETIC ENGRAM® may memorize the learned block of data and the block of data may be replaced in memory with the algorithmic network of the CYBERNETIC ENGRAM®, the output of which may be guaranteed to be the block of data. A key input may be input to the neural networks of the CYBERNETIC ENGRAM®, and the neural networks may replicate the data and output the replicated data. More than one CYBERNETIC ENGRAM® may make up a larger collection of data, such as a data file, like a Word document, Excel spreadsheet, MP3, JPEG, PDF, etc. Therefore, a learned data file, which was a bunch of blocks of flat data, may now be a bunch of neural networks in a particular order. The neural networks are a different representation of the data. Further, weights for the hidden layers of the neural networks may be stored, centrally on a memory device or distributed across multiple memory devices, such as on a blockchain.

Part of the metadata of the learned data may also be learned and verified. Principle content analysis may be used on the reconstructed data output of the neural network to determine the data's type, for example a file type, such as a Word document. As a result, there may be a file type determined by the neural network and there may be a file type reported from the metadata. This is similar to how metadata includes an extension interpretation or the data's mime type. The metadata may exist on a data storage system as it is being reported. The metadata may be stored to the data storage system separately from the data as in a filesystem. So, while the data may be replaced by the neural network, the metadata may be stored both as flat data as well as a cache data. But, there may not be enough metadata to store as a separate neural network. Some of this metadata may be fed into the CYBERNETIC ENGRAM® as an input. The verified metadata may be used by the CYBERNETIC ENGRAM® in the protection of the related data and the metadata. For example, if something is injected that may create a different result in the principal component analysis by the CYBERNETIC ENGRAM®, the principal component analysis may determine that the data may no longer be just a Word document. The principal component analysis may determine that the data may include the injected data that is different from what was previously found in the Word document, such as an executable, JavaScript, visual basic script, etc. Essentially, the CYBERNETIC ENGRAM® may identify primary, secondary, tertiary, etc. interpretations of the same data, and then determine what the data is presenting to the world, whether to users or applications, and what the data actually is. If there is a difference between what the data presents to be and actually is, the difference may be flagged.

A request to access learned data may trigger a neural network to reproduce the data. A CYBERNETIC ENGRAM® may replace data with the neural network. In order to retrieve the data, the neural network may be triggered, even from the kernel. If the filesystem driver in the kernel were to read the flat data stored after being learned by the neural network, all that would be read may be the weights of the neural network magnetically written on the disk. The data may not be directly accessible. The data may be encoded in an engine, the neural network of the CYBERNETIC ENGRAM®, which may run in order to retrieve the data. The storage of the weights instead of the data may prevent the input of the weights into another system and being transformed back to the data. In part, this may be accomplished because transformation of the weights using the neural network may be governed by a particular input to the neural network.

The particular input may be a key input that may be configured in a lot of different ways. The key input may be configured as an integrity verification key, like a digital signal signature of sorts, but a pre-signature. The key input may fall more in the mandatory integrity control world than in digital verification of the user. Various implementations of the key input may be configured to implement secrecy. Secrecy may be implemented using an asymmetric public key/private key mechanism. The key input may be configured to implement mandatory integrity. The key input may be configured to a one-time pad by adding more redundant neurons to the neural network.

The metadata that may be input to the neural network may include the user, such as a user I.D. and the group I.D. of a current process, which may provide built in data access control down at the field level. The neural network may not output certain parts of the data if the correct user is not added. So, permissions capability may be built into the key input attached to access control capability.

Filesystem operations may include open, close, read, write, and execute. On reading, the CYBERNETIC ENGRAM® may do a cycle, and we may define different cycles that can be implemented on a read. Similarly, on writing, an analogous process may be implemented. For example, the CYBERNETIC ENGRAM®'s principal component analysis subsystem may determine whether writing to the data changes the output so dramatically that the principal component no longer yields the same type, such as a docx or a PDF. For instance, a ransomware attack that comes and encrypts everything may be completely rejected by the neural network of the CYBERNETIC ENGRAM® as an update based on the results of the principal component analysis. A write operation may trigger the neural network to learn a new block. The neural network may stamp an old block on the block chain as long term memory. The learning of the new data block may cause the neural network to change the weights. If the principle component of the new data block is no longer a Word document as it is according to the previously stored weights, the write may be rejected. Practically speaking, if something comes around and tries to change disk content so dramatically so that its nature changes, generally that is a change that should be prevented as a general principle in practical world. But, the neural network may be trained to allow some mutations of the data and prevent other mutations. For example, executable mutations and Flash embedded in a PDF may not be allowed. But, users may actually pick which mutations that are and are not allowed.

In some embodiments, a collection of more than one CYBERNETIC ENGRAM® may be developed, for example, as a datastore, a network, a software definable block device, and/or a filesystem. The more than one CYBERNETIC ENGRAM® may be format independent.

In some embodiments, a collection of more than one CYBERNETIC ENGRAM® may be a decentralized distributed filesystem. The software to run the filesystem just needs to be installed. Once the filesystem is installed or once the capability is in one location, anytime any type of data comes in, the unsupervised learning engine may learn the data and processes for managing the more than one CYBERNETIC ENGRAM® may start acting appropriately on the data without human intervention.

Because the more than one CYBERNETIC ENGRAM® may be decentralized, much of the data that may be encountered on the network may be common. To represent common data, shared neural networks may be implemented and their weights may be verified. So let's take a simple example. The same block learned by multiple neural networks may produce the same hash. So, multiple different neural networks may be producing the same hash for the same flat block of data. The neural networks may be reporting a weighting scheme for their hidden layers. When one of the neural networks skews out, a consensus network using blockchain may be implemented. A neuron that has done the most work in figuring out what the weights are may be trusted and used over a skewed neural network. In the real world, when you look at blockchain, oracles are the Achilles heel. Oracles may be all the external inputs into the blockchain and the inputs may be considered verified. The values may just be accepted for what they are. Here, the filesystem of more than one CYBERNETIC ENGRAM® may implement a hybrid where oracles may not necessarily be fully trusted. Therefore, multiple oracles may be different external input reporters to an otherwise closed system where a mechanism for consensus may be used to verify their inputs.

The self aware, self healing, self defending data aspects may be implemented via the neural networks of any CYBERNETIC ENGRAM®, because even one neural network may be self aware, self healing, and self protecting from knowing its own type, content, and history. Further, the neural network may also ask its peers whether the data and metadata is still verified. In the filesystem a neural network activation may be forced in order to get data and the neural network may have all these different bits and pieces in it that make that data more interesting as an output rather than reading flat data. The forced activation of the neural network may have consequences on what happens when data is read, what happens when data is written, and what happens when data is deleted. When data is deleted, the impression of the data may still be on the block chain from a filesystem and may be restored.

When the output of a neural network may itself be an executable, the executable may be configured to maintain modification resistant, remote, smart contracts and/or self destructive data/one time use data, which may be applied to nonces, and on single time tokens for authentication and authorization.

Figure 3:
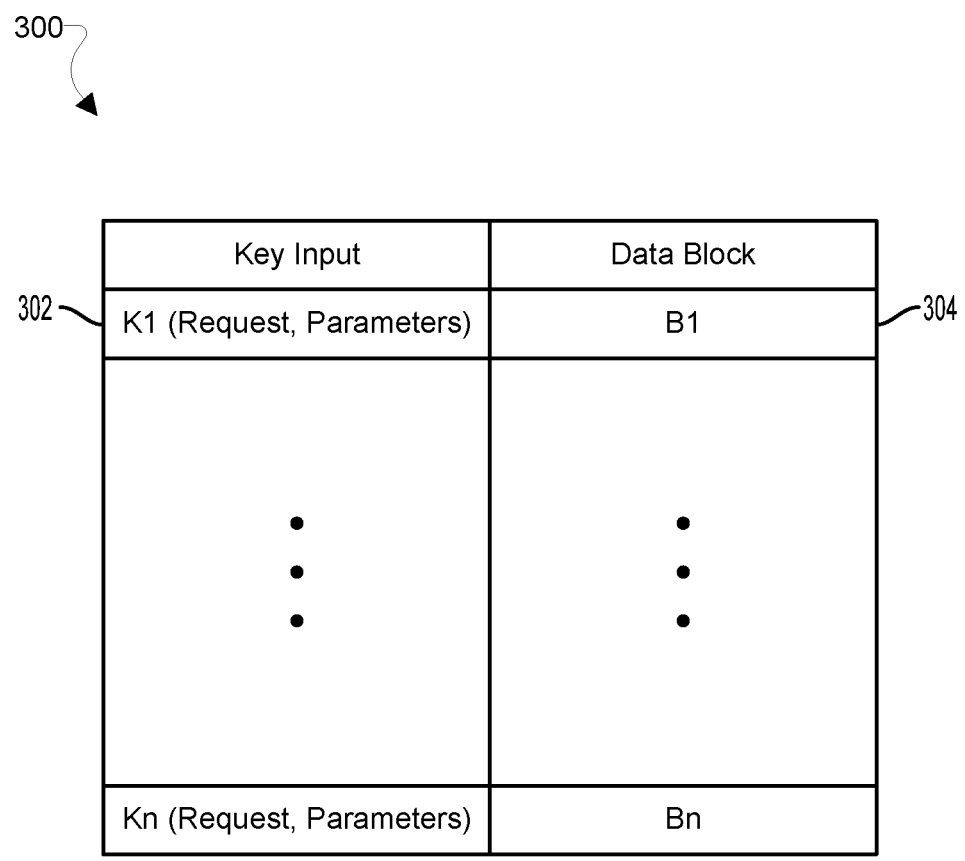
FIG. 3 is a chart diagram illustrating an example relation of key inputs and data blocks for implementing various embodiments.

In general, data is passive. Herein, passive data may be replaced with neural networks that the operating system or other application trying to access this data content may activate to access the data content. A key value store 300, as illustrated in FIG. 3, may include key inputs 302, associated with data block 304 values, that may be used as inputs to and triggers for the neural networks to access and/or operate on the data, which may be made of multiple data blocks 304. The key input values may include an operation request ("Request" in the example illustrated in FIG. 3), such as read or write, and other parameters, which may include operation request parameters and/or metadata (collectively "Parameters" in the example illustrated in FIG. 3) of the associated data block 304. In the example illustrated in FIG. 3, the data blocks 304 are shown for the purposes of illustrating the association of the key values 302 of the key value store 302 with the data blocks 304; however, in some embodiments, the data blocks 304 may be excluded from the key value store 302. While some embodiments may implement a key value store 302, the key inputs 302 may not necessarily be stored using a key value store 300 or stored at all. In some embodiments, the key inputs 302 may be generated for an operation request for a data block, for example, by a process or program attempting to access the data block; by a process or program configured to generate key inputs for the cybernetic engram in response to an operation request for a data block from another process and/or program; and/or by the cybernetic engram in response to an operation request from a process or program. In some embodiments, the key input 302 may be generated using a previous history of key input values for the cybernetic engram. In some embodiments, the key inputs 302 may be generated using temporally ordered keys, which may be discrete-time or continuous-time. In some embodiments they key inputs 302 may be generated through interrupted time-series, and/or any other time-series like input. In some embodiments, the key inputs 302 may be generated using sequenced data, any sequenced data may be a discrete sequence or a continuous sequence. In some embodiments the key inputs 302 may be generated through random placement or random assignment.

A cybernetic engram may include a function in the form of a neural network that may be run each time a data block is accessed. Execution of the function may differ between data blocks 304 associated with each cybernetic engram because weights for the neural networks, such as a multi-layer perceptron neural network, a recurrent neural network, or a long short term memory neural network, may differ based on training the neural network function for different data content. In some embodiments, a key input 302, which may include a request and/or the request's corresponding parameters, may be the input to the neural network. The key input 302, including the request, may be input to a cybernetic engram, and the neural networks of the cybernetic engram may reproduce the data block 304 associated with the key input 302 and the weights for the neural network. Rather than storing the flat data, what may be stored on any number of memory devices may be the cybernetic engram construct and the corresponding weights for the data block 304. Since the request and/or its parameters may be input to retrieve and/or operate on the data block 304, the request may be enmeshed with the data block 304. A request as an input to one of the neurons of a neural network may ensure that the appropriate requests with the appropriate weights corresponding to that data block 304 for that request is needed to retrieve and/or operate on the data block 304. This association may be done for any type of request and any corresponding parameter values for that request and the data block 304.

Data comes with metadata. Metadata may also be an input as part of a request. For example, a data block 304 may be supposed to be accessed under certain parameters, such as a username, a file owner I.D. matching a process I.D., and corresponding permission bits being set. Metadata may also be an input to this neural network. As such, security rules may be embedded right into the data. Generally, any type of arbitrary access control rules may be embedded into the data by adding the right amount of neurons to the neural network. Embedded security may be based on the weights associated with the data changing based on the key inputs. Without the appropriate weights matching the inputs, the correct output data may not be retrieved.

Figure 5:
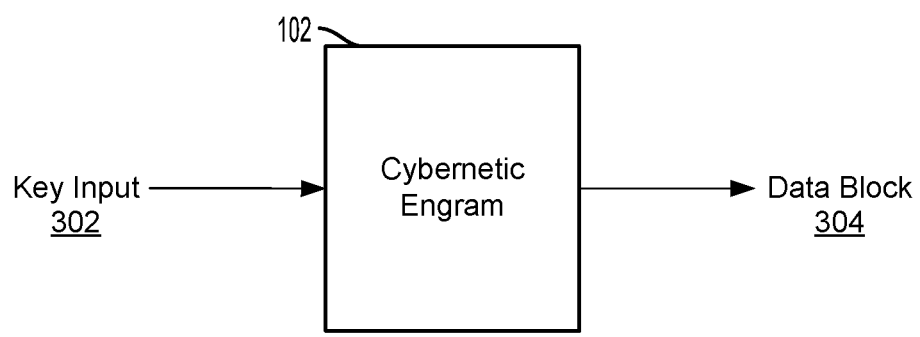
FIG. 5 is a schematic flow diagram illustrating an example representation of a data block by a CYBERNETIC ENGRAM® for implementing various embodiments.

A thick forest 100 of more than one CYBERNETIC ENGRAM® 102, as illustrated in FIG. 1, may be used to represent data made up of multiple data blocks 304. In some embodiments, a one-time pad type scrambling may be implemented on the data so that data may not be simply extracted from the thick forest 100 of more than one CYBERNETIC ENGRAM® 102. Each CYBERNETIC ENGRAM® 102 of the thick forest 100 may accept key inputs 302 and output the associated data block 304 ("Data Block" in the example illustrated in FIG. 5), as illustrated in FIG. 5. Collectively, the more than one CYBERNETIC ENGRAM® 102 of the thick forest 100 may output various related data blocks 304 using the same key input 302.

Figure 4:
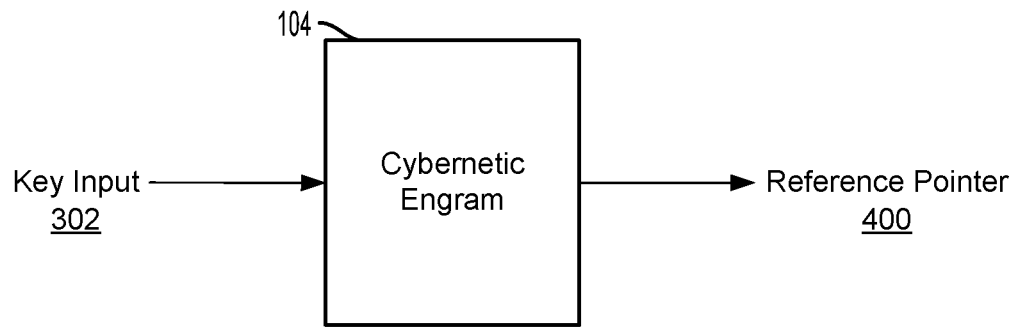
FIG. 4 is a schematic flow diagram illustrating an example generation of a CYBERNETIC ENGRAM® reference pointer for implementing various embodiments.

The interface where the operating system enters, to access and/or operate on data, may accept key inputs 302, which may include a request, request parameters, plus metadata, plus other bits and pieces. The output of a CYBERNETIC ENGRAM® 104 may not actually be the value of a data block 304, but a reference 400 ("Reference Pointer" in the example illustrated in FIG. 4) to the data blocks 304 in the thick forest 100, as illustrated in FIGS. 1 and 4. A collection of more than one CYBERNETIC ENGRAM® 104 that may reference to the more than one CYBERNETIC ENGRAM® 102 of thick forests 100 may be a thin forest of more than one CYBERNETIC ENGRAM® 104. The neural networks may actually output references 400 to where the data blocks 304 may be located in the thick forest 100. A CYBERNETIC ENGRAM® 104 of a thin forest may output the key input 302 to trigger the more than one CYBERNETIC ENGRAM® 102 of the thick forest 100. Eventually, there may be another neural network (not shown) that may take the output of the thick forest 100 and reconstruct data from the data blocks 304. The linked thin and thick forests 100 of more than one CYBERNETIC ENGRAM® 102, 104 may allow the compression of data and data deduplication. The linked more than one CYBERNETIC ENGRAM® 102, 104 may also allow for deep data analysis and/or deep learning.

In some embodiments, in addition to a neural network configured to reconstruct the data block 304 using the key input 302 and related weights, the CYBERNETIC ENGRAM® 102, 104 may further include neural networks (e.g., "Sequencing Neural Networks" 202, "Verification Neural Networks" 208, "Authorization Neural Networks" 210 in the example illustrated in FIG. 2) configured for other functions for the data block 304, as illustrated in FIG. 2. For example, another neural network may function like a control filter. When an update request comes in for the data block 304, the CYBERNETIC ENGRAM® 102, 104, via the other neural network contained within, may be the only component of a computing device that can change the weights for the data block 304.

When a write record request happens, access control may be implemented for the data block 304 including, for example, a principal component analysis. In some embodiment, the principal component analysis may determine whether the write record request is trying to change the data type. For example, the metadata of the data block 304 may indicate the data type as a docx, because that is the tail end, mime type, or header information. The CYBERNETIC ENGRAM® 102, 104 may recognize the data block 304 as a docx type as reported by the metadata. But, the CYBERNETIC ENGRAM® neural network configured to implement principal component analysis may identify the data type of the data block 304 as an executable, or identify that the data block 304 includes embedded JavaScript or some other undesired object, from the weights of the updated data block 304. For an undesirable change to the data block 304, the CYBERNETIC ENGRAM® 102, 104 may reject that update to the data block 304.

The neural networks of any CYBERNETIC ENGRAM® 102, 104 may be configured to classify and verify various types for the data blocks 304, such as executable, JPEG, PDF, Word documents, Excel documents, etc. Each type may have some common features among the data block 304 of a type other than the header. Each type may have a flow to the content of the data block 304.

To train the neural networks, the data blocks 304 may be run through the neural networks. For example, two inputs may be expanded into a whole bunch of perceptrons in a multilayer perceptron neural network. Random weights may be selected to train the neural network. As the neural network operation progresses through the layers, the number of neurons in each layer may be reduced compared to the number of neurons from an earlier layer. Then the neural network may expand the number of neurons in a next layer back out to the number of neurons from the earlier layer. The weights may be adjusted until the output of the neural network is the same as the input to the neural network. So, if an input is x1 and x2 the output is supposed to be x1 and x2. If the neural network has been trained against multiple Word documents, the weights used to confirm whether the input x1 and x2 maintain an output of x1 and x2 as a Word document may contain what makes a Word document a Word document. An example of where this may be useful may be in a ransomware attack where the data block may be fundamentally changed by encryption, the CYBERNETIC ENGRAM® 102, 104 may not allow updating the weights for the data block 304.

Access control may also be embedded into the weights of the data block 304, and a neural network of the CYBERNETIC ENGRAM® 102, 104 may be configured to determine whether a user and/or process identified in a key input 302 is authorized to access the data block 304 and/or what the user and/or process is authorized to do with the data block 304, such as read, write, copy, etc. Similar to the neural network for verifying data types, the neural network configured for access control may take inputs and expect the output to be the same as the input when applying the weights of the data block 304. Access may be granted in response to the inputs and outputs being the same, and denied in response to differences between the inputs and output.

Even when an update takes place a history of the weights for the data block 304 may be stored, on a blockchain for example. The history of the weights for the data block 304 may extend to the original weights for the data block 304. The history of the weights may be stored for each data block 304. So, the content of the data may be embedded in the stored weights. In addition, the fact that an update was implemented may also be embedded in the stored weights, as may be who requested the update. The stored history of the weights may allow for reversal of an update and reading of previous versions of the data. A distributed storage of the history of the weights of the data blocks 304 may allow access to the data even if portions of the network of storage devices is unavailable as copies of the weights may be stored in multiple locations.

In some embodiments, replacement of the data blocks 304 by any CYBERNETIC ENGRAM® 102, 104 may allow deduplication of data on a networked system. The weights of the data blocks 304 may be shared and accessed by multiple computing devices, each of which may implement at least one CYBERNETIC ENGRAM® 102, 104 to use the weights to reconstruct the data blocks 304 for their own use. Deduplication in this manner may be advantageous for static data that is accessed by multiple computing device so as not to have to maintain multiple copies of the same data blocks 304 on the multiple computing devices. For example, multiple computing devices may execute large portions of the same operating system using the static operating system image. Rather than storing the static operating system image on each computing device, the computing devices may access the data blocks via a shared thick forest 100 of more than one CYBERNETIC ENGRAM® 102, which may be where the actual data resides. Each computing device may execute a CYBERNETIC ENGRAM® 102, 104, for example from a thin forest of more than one CYBERNETIC ENGRAM® 104 on the computing device that may provide a reference 400 into the storage of the thick forest 100 of more than one CYBERNETIC ENGRAM® 102.

In some embodiments, the neural networks of the CYBERNETIC ENGRAM® 102, 104 may be executed in parallel, and once all verifications, authentications, and other functions are completed and an access to the data block 304 may be deemed allowable, then access to the data block 304 may be provided to the requesting source and/or operations on the data block 304, updating the weights for the data block 304, may be stored. If the access to the data block 304 is deemed denied, then the access to the data block 304 may be prevented and/or operations on the data block 304, such as updating the weights for the data block 304, may be discarded. In some embodiments, asynchronous request processing by multiple processors implementing more than one CYBERNETIC ENGRAM® 102, 104 may be implemented and may positively impact the processing performance of the data. For example, when set up as a decentralized filesystem, thousands of processors may ask for the data and the weights may be provided to all the requesting processors.

In some embodiments, any CYBERNETIC ENGRAM® 102, 104 may be implemented for a filesystem with a key value store 300. In some embodiments, any CYBERNETIC ENGRAM® 102, 104 may be implemented for an arbitrary database for an arbitrary record or for any real data storage type. The environment for which any CYBERNETIC ENGRAM® 102, 104 may be implemented doesn't have to be a specific format. Any CYBERNETIC ENGRAM® 102, 104 may be format independent and storage type independent.

In some embodiments, any CYBERNETIC ENGRAM® 102, 104 may be implemented as a thinly provisioned filesystem, which may function as a new filesystem driver or an overlay filesystem. For example, data and changes to data may be stored in layers in the filesystem. Original data may be stored in an original filesystem layer. Filesystem edits to the original data and/or new data may be stored to a different layer Unchanged original data may be accessed from the original layer and the updated portions of the original data or new data may be accessed from the different layer. Layers may be added so that edits to the data may be stored at various locations. The layers may be merged and provide the data from a combination of layers.

Similarly, any CYBERNETIC ENGRAM® 102, 104 may be used to store the weights for the original data, and any updates to the original data may be stored as newer weights. Data which is not associated with stored weights may trigger the any CYBERNETIC ENGRAM® 102, 104 to learn the data and store weights for an original version of the data. In some embodiments, rather than storing weights for all of the data in the filesystem, only the updates to the original data may trigger learning and storing of weights by the any CYBERNETIC ENGRAM® 102, 104. In some embodiments, changes to a collection of original data may trigger the any CYBERNETIC ENGRAM® 102, 104 to learn and store weights for the collection of data, while the any CYBERNETIC ENGRAM® 102, 104 may not learn original data that remains unchanged. In an example, when any CYBERNETIC ENGRAM® 102, 104 is first applied to existing data in a filesystem or when updates are made to the data of the filesystem, the any CYBERNETIC ENGRAM® 102, 104 may learn the data in the filesystem and store weights for the learned data. From a collection of data blocks 304 that have stored weights, an update to an original data block 304 may store new weights for the updated data block 304 in addition to the weights for the collection of data blocks 304. Requests may be made to retrieve the weights for the data blocks 304 at various times in the history of the data blocks 304. Which weights are requested and retrieved may control which version of a data block 304 is reconstructed. Access control to the weights may be determined by the access control for the data originally stored on the filesystem. For an update to a data block 304, the CYBERNETIC ENGRAM® thick forest 100 representing the collection of data to which the data belongs may perform verification, authorization, and other function checks on various data blocks 304 of the collection to help determine whether the update to the data block 304 is allowable. For example, an update to a single data block 304 may not fail principle component analysis on its own, as a single data block 304 may not have enough data or may not change enough to indicate that a data type is being changed. However, in combination with related data blocks 304, together the changes to the related data blocks 304 may indicate to the CYBERNETIC ENGRAM® thick forest 100 that an undesirable change is occurring to the data block 304. Further, CYBERNETIC ENGRAM® activity may provide data that creates a heat map of which data is being used and updated. Data that is not being used or updated may be archived.

Any CYBERNETIC ENGRAM® 102, 104 may be implemented as a filesystem driver that may be loaded either into an operating system kernel or as live filesystem in userspace (FUSE). Any CYBERNETIC ENGRAM® 102, 104 may be implemented as a replicating database of an original database. Database queries may be directed to the replicating database, and when the replicating database has the data the replicating database may provide the data. When the replicating database doesn't have the data, the replicating database may query the original database and create the output.

In some embodiments, for CYBERNETIC ENGRAM® implementation across multiple computing devices, decentralized storage of the weights may make all the free disk space available on all computing device and presents the disk space as a share. The disk space may be presented as a share, as a data store, or as a block device.

In some embodiments, any CYBERNETIC ENGRAM® 102, 104 may be implemented on a single computing device. Single computing device implementation may achieve all the benefits of the artificial intelligence provided by the neural networks of the any CYBERNETIC ENGRAM® 102, 104. However, benefits of blockchain weight storage may not be realized.

The weights for a data block 304 may be redundantly stored across multiple computing devices so that when some computing devices are unavailable, the data block 304 is still accessible. So, implementing the any CYBERNETIC ENGRAM® 102, 104 on multiple computing devices allows for deduplication of data because each computing device may not need to store all of the data. But weights for a data block 304 may be redundantly stored for erasure codes. So, there may be a balance between the erasure code and deduplication. Data updates may use xdelta or rsync type protocols to pass binary differentials in restoring the differentials on the distributed weight memory. So, for all the weights stored for a data block 304, the next entry may include just the difference in weights caused by an update. Each instance of the weights and weight differentials may be time stamped to create a history of a file containing the data block 304.

The metadata for a data block may get weaved into the statistics of the file. Such as, when was the file last modified. This may include parts of the metadata that may not be included in the key input 302 as the metadata may depend on the operating system kernel, which may not always be trusted. Metadata may be generated by the operations of the neural networks of the any CYBERNETIC ENGRAM® 102, 104, and that metadata may be enmeshed in the weights for the data block 304 of a file.

The metadata may be used for verification or keeping arbitrary key values associated with files. For example, to create arbitrary whitelist labeling specifying which users have permissions. Or, for example, to mark something sensitive by giving it a secret label in a caveat. Use of the metadata to associate arbitrary key values with files may provide ability to implement deterministic access control on a file. For example, a secret file's content will always create a secret file. In another example, the association may allow for enforcement of write up read down access controls.

In some embodiments, any CYBERNETIC ENGRAM® may be implemented as a filesystem overlay and/or as a filesystem filter.

In some embodiments, the weights may be stored in a centralized memory device, such as on a log structure filesystem, like NILFS, which may provide for journaling. A log structure filesystem may provide the similar ability as a blockchain for historical tracking of the weights.

In some embodiments, heuristics may be used to assess what may be the relative value of any data block 304 and then what may be the relative value of a file. With the value information of the file, value based access control may be implemented. For example, value may be measured in trust credits. A total value of trust credits for a collection of data may be "x" and a user or process may be assigned "y" trust credits for a time period. Actions and data may be individually assigned a trust credit cost, and each implementation of an action or access of a data may reduce the user's or process's balance of trust credits. An insufficient balance of trust credits may prevent the user or process from implementing an action or accessing a data. In some embodiments, a user or process may be given trust credits by a higher trusted user or process. However, giving of trust credits may diminish the balance of the trust credits of the higher trusted user or process. Over time, the trust credit balance may replenish. Some applications of value based access control may be to prevent excessive data downloads to an external device or via a network connection, or providing limited access to a collection of data in which only a certain amount, rather than which data, may be accessed. Value based access control may be implemented on an individual basis or up to an enterprise basis, in which an enterprise may have a trust credit balance that it may not exceed. Value based access control may allow quantification of improper action on a collection of data by any number of users or processes, individually or jointly.

A CYBERNETIC ENGRAM® 102, 104, as illustrated in FIG. 2, may be configured with a formal way to access the data block 304 it represents and with a transformation process to make changes to the data block 304. Access and changes to the data block 304 may not be implemented without use of the access and transformation processes of the CYBERNETIC ENGRAM® 102, 104. A CYBERNETIC ENGRAM® 102, 104 may also be configured with an integrity verification process configured to check the transformation process and the results of the transformation process. A user and/or process attempting to execute the processes of a CYBERNETIC ENGRAM® 102, 104 may be subject to an authorization check by the CYBERNETIC ENGRAM® 102, 104.

A key input 302 to the CYBERNETIC ENGRAM® 102, 104 may include an identification of the user, the requested transformation process, and other parameters, which may include metadata of the data block 304. The key input may be provided to, retrieved by, and/or generated by the CYBERNETIC ENGRAM® 102, 104. The key input 302 may be provided to a neural network of the CYBERNETIC ENGRAM® 102, 104 for configuring a transformation process and executing the transformation process on the data block 304, e.g., sequencing neural networks 202 as illustrated in FIG. 2, updating the weights for the data block. The key input 302 may be provided to a neural network of the CYBERNETIC ENGRAM® 102, 104 for executing an integrity verification process, e.g., a verification neural network 208 as illustrated in FIG. 2, to make sure that the transformation process did the right thing and check the validity of the transformation process. The key input 304 may be provided to a neural network of the CYBERNETIC ENGRAM® for executing user and/or process authorization, e.g., authorization neural network 210 as illustrated in FIG. 2, to check whether the user and/or process has permission to access and/or request the transformation process for the data block 304.

A CYBERNETIC ENGRAM® 102, 104 may further include a neural network configured as a memory, e.g., neural network memory bank 206 as illustrated in FIG. 2. In some embodiments, the neural network memory bank 206 may be configured as a neural programmer interpreter (NPI), a neural Turing machine (NTM), and/or a combination of an NPI and an NTM. In some embodiments, the neural network memory bank 206 may be configured as any machine that may parses context sensitive languages, so as long as the machine is a pushdown automata with two stacks attached. The neural network memory bank 206 may be configured to store small amounts of data, like a main memory or a cache may store small amounts of data for access by a processor. The data stored in the neural network memory bank 206 may include weights for associated data blocks 304. The neural network memory bank 206 may be configured to store references 400 to a CYBERNETIC ENGRAM® thick forest 100 representing data blocks 304 associated with the CYBERNETIC ENGRAM® 102, as illustrated in FIGS. 1 and 4.

The sequencing neural networks 202 may include a long short-term memory (LSTM) forest and a recurring neural network (RNN) forest. Which of the neural network forests is used by the CYBERNETIC ENGRAM® 102, 104 may be a dynamic choice. In certain cases RNNs may work better because they may learn faster. Further, RNNs may not have as good memory capacity as an LSTM, which may not be necessary for a CYBERNETIC ENGRAM® 102, 104 that may be configured to output an external reference 400 to a CYBERNETIC ENGRAM® thick forest 100 or to a location in the neural network memory bank 206, referred to herein as an i-node. When a CYBERNETIC ENGRAM® 104 that is configured to output an i-node or an external reference 400, it may not be necessary to remember a previous i-node or external reference 400. However, an LSTM may be better suited for use when remembering prior versions of the data block 304 by remembering weights from before they were transformed.

A CYBERNETIC ENGRAM® 102, 104 may further include a pool of logic gates or operational gates, e.g., pool of gates 200 as illustrated in FIG. 2. The pool of gates 200 may include primitive functions, for example read, write, copy, go to, if, for, while, print, etc. The sequencing neural networks 202 may create a sequencing of the gates to implement a transformation. The sequencing may be learned and dependent upon the operations appropriate for a data structure being transformed. For example, the data subject to transformation may be untyped data. Simple reads and writes of untyped data may employ primitives for untyped data that read and write at bit or byte level. The data subject to transformation may be typed data. Then the primitives may still be read write, but the verification neural network 208 make sure that type enforcement is on. For example, if a request is for reading a 32 bit integer the verification neural network 208 may make sure the output data is 32 bits. The verification neural network 209 may be trained to do type verification, for example to ensure a 32 bit integer is returned. Plus, when the sequencing neural networks 202 return data out on read, the verification neural network 208 may make sure that the returned data is aligned properly, is right number of bytes, etc. The verification neural network 208 may put restrictions on the type of data returned. The verification neural network 208 may make sure the sequencing neural networks will output the right amount of data using a proper sequence of gates by looping through the sequence of gates and making sure the sequence is correct and produces the expected output. The CYBERNETIC ENGRAM® 102, 104 may build its verification neural network 208, using an unsupervised training model to figure out how to verify a data type by automatically sorting data through various data types and even automatically classifying data internally.

The CYBERNETIC ENGRAM® 102, 104 may combine any number of neural networks configured for various functions. In some embodiments, the CYBERNETIC ENGRAM® 102, 104 may be configured as primitive storage of variable size. The configuration of a neural network memory bank 206 may be a result of choices that configure the CYBERNETIC ENGRAM® 102, 104. The CYBERNETIC ENGRAM® 102, 104 may transform between different types. For example, a type 1 may be a transformation plus store. The neural network memory bank 206 may be configured as a sparse auto encoder neural network with two or more hidden layers. The neural network memory bank 206 may be configured to make sure that its output is the same as the input given to it. The neural network memory bank 206 may be configured to store data as a probability distribution over a collection of neural networks and/or flat memory banks that is larger than the input neural network. The number of neurons may be flexible and may increase to make sure that whatever output is expected is what is produced. For example, three bits of information may be stored in 20 neurons in a hidden layer. A sparse auto encoder neural network may be useful to ensure that very similar inputs do not produce the same output or each other's output, and accuracy may be improved depending on how many neurons are used.

In another example, a type 2 may be a verification plus store. Principal component analysis may be used for verification and use a neural network in which the input neurons are greater in number than the hidden neurons. However, the output may be expected to be the same as the input, just like the sparse auto encoder neural network. Other verification techniques may be learned by the verification neural network 208, such as the Clark-Wilson model, the Bell-LaPadula model, the Biba Integrity model, etc.

The neural network memory bank 206 may include a flag, which it may have learned, that may indicate whether stored data is an i-node, which means it is a reference 400 internal to the CYBERNETIC ENGRAM® 102, 104, or it is a reference 400 to some data another CYBERNETIC ENGRAM® 102, 104 may represent.

In some embodiments, all data associated with a collection of data blocks 304, which may be as few as one data block 304, may be represented by and the weights stored in a CYBERNETIC ENGRAM® 102, 104. A query for the data may result in an output of the data. In some embodiments, all data associated with a collection of data blocks 304 may not reside in one CYBERNETIC ENGRAM® 102, 104 due to size limitations of the CYBERNETIC ENGRAM® 102, 104. The initial key input 302 may be to a CYBERNETIC ENGRAM® 102, 104 that may have a memory of the one or more at least one CYBERNETIC ENGRAM® 102, 104, such as a CYBERNETIC ENGRAM® thick forest 100, that may represent the data of the query. The more than one CYBERNETIC ENGRAM® 102, 104 representing the data of the query may be linked together. Data may be represented by at least one CYBERNETIC ENGRAM® 102, 104 in a CYBERNETIC ENGRAM® thick forest 100 and/or one or more CYBERNETIC ENGRAM® thick forests 100. For data that is too large to be represented by a single CYBERNETIC ENGRAM® 102, 104 and/or CYBERNETIC ENGRAM® thick forest 100, more than one linked CYBERNETIC ENGRAM® 102, 104 and/or CYBERNETIC ENGRAM® thick forests 100 may be used to represent the data. In some embodiments, the more than one linked CYBERNETIC ENGRAM® 102, 104 of a CYBERNETIC ENGRAM® thick forest 100 may be linked serially. In some embodiments, the more than one linked CYBERNETIC ENGRAM® 102, 104 of a CYBERNETIC ENGRAM® thick forest 100 may be linked in parallel. In some embodiments, the linked CYBERNETIC ENGRAM® thick forests 100 may be linked serially. In some embodiments, the linked CYBERNETIC ENGRAM® thick forests 100 may be linked in parallel.

Read and write are two example operations for which you may put in any type of primitive gate and then get an LSTM or RNN forest of the sequencing neural networks 202 to create a sequence and act on the sequence. There may be decision communication back-and-forth between the sequencing neural networks 202 and the neural network memory bank 206 to figure out the type mode to set the CYBERNETIC ENGRAM® 102, 104 and what may be the result of all of the control functions. For example, the decision communications may indicate whether the CYBERNETIC ENGRAM® 102, 104 may allow a read to occur, or when an update should occur, or how an operation may occur, etc.

The neural network memory bank 206 may further include a LSTM neural network gate, e.g., neural network history gate 204 as illustrated in FIG. 2. The neural network history gate 204 may be configured to remember previous weights for data that existed prior to an update to the weights for the data. This may be accomplished because the neural network history gate 204 may remember the previous value in the neural network history gate 204. The stored weights of the LSTM neural network memory gate 204 may provide ability to maintain coherency of data and reversal to previous versions of data. The values remembered by the neural network history gate 204 may eventually end up on a memory device. When the neural network history gate 204 accepts a new value, old weight values may be stored on a memory device, for example in a blockchain. Depth of the neural network history gate 204 may be variable. The neural network history gate 204 may figure out what to forget correctly. The neural network history gate 204 may include a forget gate and may figure out what to remember and what to forget.

Feedback from the neural network history gate 204 may be provided to the sequencing neural networks 202. The feedback may inform the sequencing neural networks 202 what primitive function to trigger next. The neural network history gate 204 may identify that there is a difference between what is stored in the weights of the data block 304 and what's being requested as an update. Identification of that difference may trigger the principle component analysis by the verification neural network 208 and/or the other, which may be encoded in the primitive functions. For example, the difference identified by the neural network history gate 204 could trigger the sequencing neural networks 202 to implement a write up read down test, do a verification of type, or do other tests to identify how the data may have been altered. The CYBERNETIC ENGRAM® 102, 104 may have a history of the versions of the data block 304. So, when the CYBERNETIC ENGRAM® 102, 104 does tests on an update request, the CYBERNETIC ENGRAM® 102, 104 may compare the update request result to the history of the versions of the data block 304, which may include more than just the previous version. The CYBERNETIC ENGRAM® 102, 104 may compare the update request result to an overall history that may represent stronger or weaker aspects of the data depending on the persistence and presence of the aspect in history.

A deeper history of the data may afford the data stronger self-protection because the neural networks of the CYBERNETIC ENGRAM® 102, 104 may have more training data and a stronger sense of the aspects of the data. As such, during comparisons with the history of the versions of the data block 304, the neural networks may learn that changes to the data block 304, and particularly changes outside of more frequently experienced types for the data block 304, may be more likely to be undesirable. Therefore, unfamiliar changes to the data block 304 may be deemed undesirable and not permitted.

For example, the neural networks may be fully differentiable, which may allow for executing gradient descent on neural network outputs when they are training. The gradient decent may allow neural networks to emphasize important aspects of the data block 304 and forget non-important aspects of the data block 304. For example, the values of the data block 304 may not be important as they may change frequently compared to the important aspect of the size of the data block 304 which may be persistent throughout the history of the versions of the data block 304.

Each instance of a CYBERNETIC ENGRAM® 102, 104, as illustrated in FIG. 2, may include, at least, read and/or write primitive function in the pool of gates 200, the sequencing neural networks 202, the neural network memory bank 206, the neural network history gate 204, the verification neural network 208, and the authorization neural network 210. Additional neural networks may be included in a CYBERNETIC ENGRAM® 102, 104 depending on desired functions for implementation of the CYBERNETIC ENGRAM® 102, 104. The neural networks, like LSTM, RNN, NPI, may be neural networks with a stack attached for available memory to do their operations.

In addition to locally storing a history of versions of weights for a CYBERNETIC ENGRAM® 102, 104, the neural network history gate 204 may maintain history of what verification processes have been used, what neural networks have been used, how transformations were implemented, what user and/or process has read from and/or written to the data block 304, what requests were allowed and/or rejected, whether transformation process have been verified, etc.

In some embodiments, sequenced primitive functions may be transferable between more than one CYBERNETIC ENGRAM® 102, 104. A sending CYBERNETIC ENGRAM® 102, 104 may sequence primitive functions so that a receiving CYBERNETIC ENGRAM® 102, 104 may implement the sequenced primitive functions and achieve an intended result, such as a specific output, in response to inputting a correct key input 302. For example, the sequenced primitive functions may allow for a CYBERNETIC ENGRAM® 102, 104, receiving and implementing the sequenced primitive functions with the correct key input 302, to be run one time. The one time sequence of primitive functions may be used, for example, to provide one time access to data, and upon access to the data, the sequenced primitive functions may delete the data. An example use may be sending a credit card number in an encoded manner and such that the encoded credit card number self-destructs upon access to the decoded credit card number.

In some embodiments, a portion of the key input 302 may be shared so that the receiving CYBERNETIC ENGRAM® 102, 104 may execute the sequenced primitive functions and achieve the intended result. In some embodiments, the shared portions of the key input 302 may be encrypted and/or the output may be encrypted, for example with a public key of the recipient, and to successfully implement the sequenced primitive functions, the encrypted key input 302 and/or output may be decrypted using a recipient's private key. In some embodiments, the CYBERNETIC ENGRAM® 102, 104 may function as a decryption engine and an encrypted portion of a key input 302 may be input with a private key portion of the key input 302. The CYBERNETIC ENGRAM® 102, 104 may verify and/or authorize the key input upon decryption of the key input and execute the sequenced primitive functions.

Similarly, various sequenced primitive functions may be sent between more than one CYBERNETIC ENGRAM® 102, 104 and execution of the sequenced primitive functions may retrieve the data blocks 304 from and store updates to the data blocks 304 on a distributed memory, such as a blockchain. In some embodiments, an accounting of actions made in relation to the data blocks 304 may also be retrieved from and stored to the distributed memory. In some embodiments, the accounting of action may be stored in the weights for the data blocks 304. In some embodiments, the accounting of action may be stored separately from the weights for the data blocks 304. In some embodiments, the data blocks 304 may not be shared on the distributed memory, but the accounting of action may be stored separately on the distributed memory. An example implementation may be smart contracts shared via a network in which the data making up the smart contracts may be securely shared and tracked.

Figure 6:
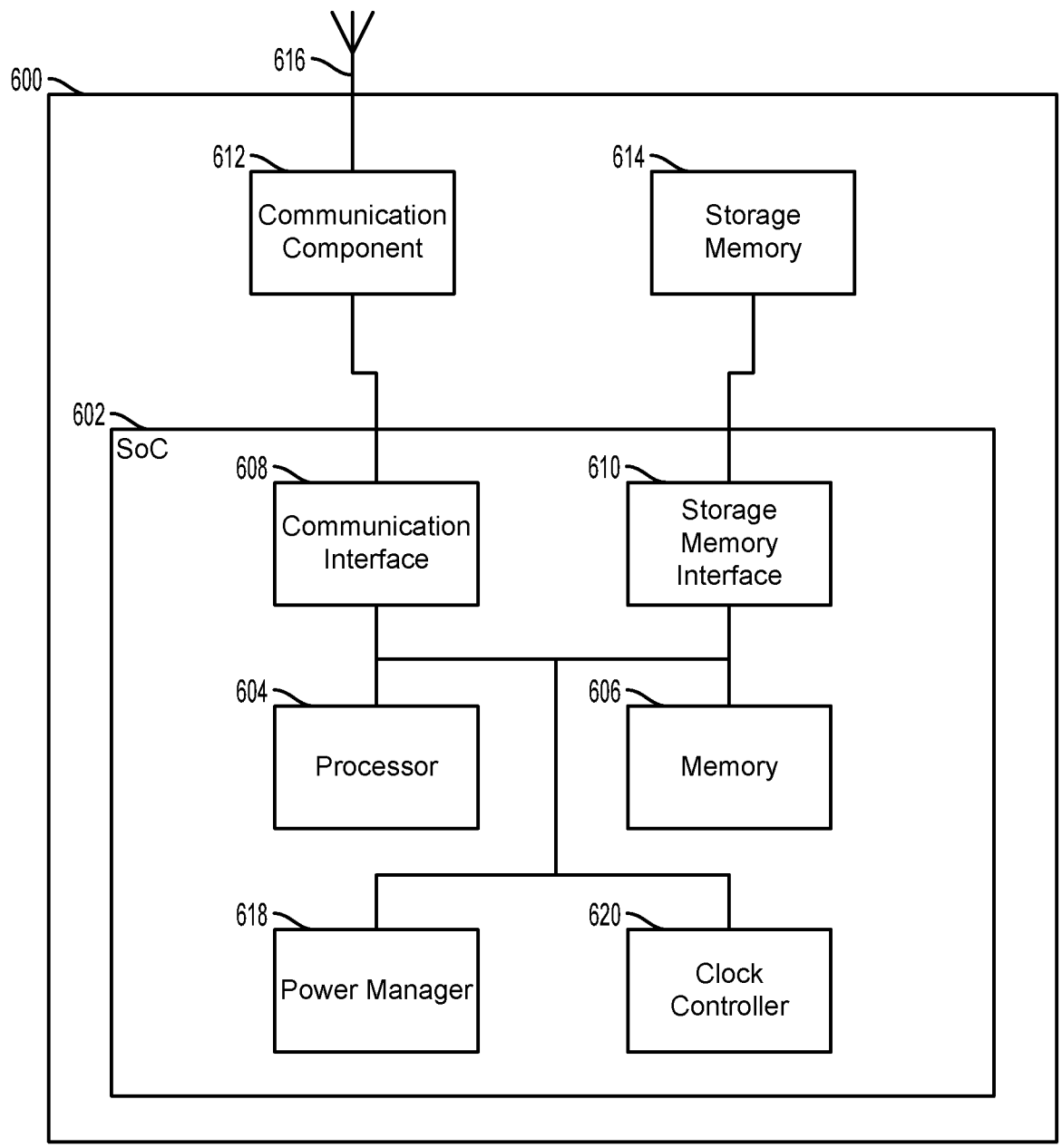
FIG. 6 is a component block diagram illustrating an example computing device suitable for implementing various embodiments.

The various aspects (including, but not limited to, aspects described above with reference to FIGS. 1-5) may be implemented in a wide variety of computing systems, including a computing device. FIG. 6 illustrates a system including a computing device 600 suitable for use with the various aspects. The computing device 600 may include a system-on-chip (SoC) 602 with a processor 604, a memory 606, a communication interface 608, a storage memory interface 610, a power manager 618, and a clock controller 620. The computing device 600 may further include a communication component 612, such as a wired or wireless modem, a storage memory 614, and an antenna 616 for establishing a wireless communication link. The processor 604 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 604 and processor cores, such as a general purpose processor, a central processing unit (CPU), a digital signal processor (DSP), a graphics processing unit (GPU), an accelerated processing unit (APU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 602 may include one or more processors 604. The computing device 600 may include more than one SoC 602, thereby increasing the number of processors 604 and processor cores. The computing device 600 may also include processors 604 that are not associated with an SoC 602. Individual processors 604 may be multicore processors as described below with reference to FIG. 7. The processors 604 may each be configured for specific purposes that may be the same as or different from other processors 604 of the computing device 600. One or more of the processors 604 and processor cores of the same or different configurations may be grouped together. A group of processors 604 or processor cores may be referred to as a multi-processor cluster.

The memory 606 of the SoC 602 may be a volatile or non-volatile memory configured for storing data and processor-executable code for access by the processor 604. The computing device 600 and/or SoC 602 may include one or more memories 606 configured for various purposes. One or more memories 606 may include volatile memories such as random access memory (RAM) or main memory, or cache memory. These memories 606 may be configured to temporarily hold a limited amount of data received from a data sensor or subsystem, data and/or processor-executable code instructions that are requested from non-volatile memory, loaded to the memories 606 from non-volatile memory in anticipation of future access based on a variety of factors, and/or intermediary processing data and/or processor-executable code instructions produced by the processor 604 and temporarily stored for future quick access without being stored in non-volatile memory.

The memory 606 may be configured to store data and processor-executable code, at least temporarily, that is loaded to the memory 606 from another memory device, such as another memory 606 or storage memory 614, for access by one or more of the processors 604. The data or processor-executable code loaded to the memory 606 may be loaded in response to execution of a function by the processor 604. Loading the data or processor-executable code to the memory 606 in response to execution of a function may result from a memory access request to the memory 606 that is unsuccessful, or a "miss," because the requested data or processor-executable code is not located in the memory 606. In response to a miss, a memory access request to another memory 606 or storage memory 614 may be made to load the requested data or processor-executable code from the other memory 606 or storage memory 614 to the memory 606. Loading the data or processor-executable code to the memory 606 in response to execution of a function may result from a memory access request to another memory 606 or storage memory 614, and the data or processor-executable code may be loaded to the memory 606 for later access.

The storage memory interface 610 and the storage memory 614 may work in unison to allow the computing device 600 to store data and processor-executable code on a non-volatile storage medium. The storage memory 614 may be configured much like an aspect of the memory 606 in which the storage memory 614 may store the data or processor-executable code for access by one or more of the processors 604. The storage memory 614, being non-volatile, may retain the information after the power of the computing device 600 has been shut off. When the power is turned back on and the computing device 600 reboots, the information stored on the storage memory 614 may be available to the computing device 600. The storage memory interface 610 may control access to the storage memory 614 and allow the processor 604 to read data from and write data to the storage memory 614.

A power manager 618 may be configured to control the distribution and amount of power to any of the components of the computing device 600, including the processor 604, the memory 606, the communication interface 608, the storage memory interface 610, the clock controller 620, the communication component 612, the storage memory 614, and the antenna 616. The power manager 618 may be configured to control a power state of any of the components of the computing device 600 and the computing device 600 itself. In some aspects, the power manager 618 may be implemented as a separate circuit component on the SoC 602, such as a special purpose circuit, a dedicated processor configured with firmware and/or software, or a combination of dedicated circuitry and a dedicated processor configured with firmware and/or software.

The clock controller 620 may be configured to control the clock mode, such as an oscillating frequency of a crystal oscillator and/or gate signal, provided to the resource components of the computing device 600, such as the processor 604, the communication interface 608, the storage memory interface 610, the power manager 618, and the communication component 612. The clock controller 620 may be configured to provide the components of the computing device 600 with an oscillating signal configured to coordinate executions by circuits of the components of the computing device 600. In some aspects, the clock controller 620 may be implemented as a separate circuit component on the SoC 602, such as a special purpose circuit, a dedicated processor configured with firmware and/or software, or a combination of dedicated circuitry and a dedicated processor configured with firmware and/or software.

Some or all of the components of the computing device 600 and/or the SoC 602 may be arranged differently and/or combined while still serving the functions of the various aspects. The computing device 600 may not be limited to one of each of the components, and multiple instances of each component may be included in various configurations of the computing device 600.

Figure 7:
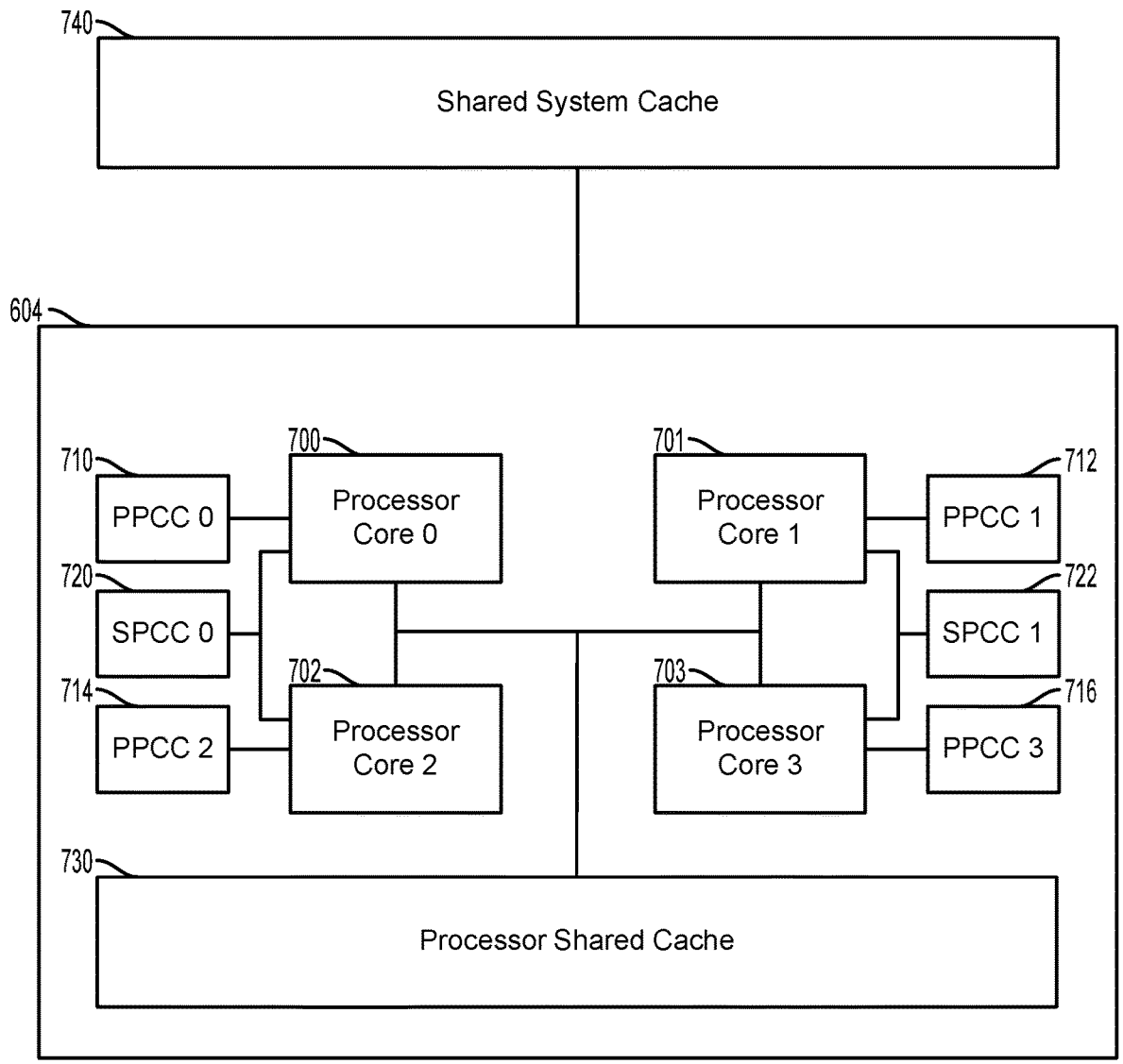
FIG. 7 is a component block diagram illustrating an example multicore processor suitable for implementing various embodiments.

The various aspects (including, but not limited to, aspects described above with reference to FIGS. 1-6) may be implemented in a wide variety of computing systems, including in various processors. FIG. 7 illustrates components of a computing device suitable for implementing an aspect. The processor 604 may include multiple processor types, including, for example, a CPU and various hardware accelerators, such as a GPU, a DSP, an APU, subsystem processor, etc. The processor 604 may also include a custom hardware accelerator, which may include custom processing hardware and/or general purpose hardware configured to implement a specialized set of functions. The processors 604 may include any number of processor cores 700, 701, 702, 703. A processor 604 having multiple processor cores 700, 701, 702, 703 may be referred to as a multicore processor.

The processor 604 may have a plurality of homogeneous or heterogeneous processor cores 700, 701, 702, 703. A homogeneous processor may include a plurality of homogeneous processor cores. The processor cores 700, 701, 702, 703 may be homogeneous in that, the processor cores 700, 701, 702, 703 of the processor 604 may be configured for the same purpose and have the same or similar performance characteristics. For example, the processor 604 may be a general purpose processor, and the processor cores 700, 701, 702, 703 may be homogeneous general purpose processor cores. The processor 604 may be a GPU or a DSP, and the processor cores 700, 701, 702, 703 may be homogeneous graphics processor cores or digital signal processor cores, respectively. The processor 604 may be a custom hardware accelerator with homogeneous processor cores 700, 701, 702, 703.

A heterogeneous processor may include a plurality of heterogeneous processor cores. The processor cores 700, 701, 702, 703 may be heterogeneous in that the processor cores 700, 701, 702, 703 of the processor 604 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 602 of FIG. 6) may include any number of homogeneous or heterogeneous processors 604. In various aspects, not all off the processor cores 700, 701, 702, 703 need to be heterogeneous processor cores, as a heterogeneous processor may include any combination of processor cores 700, 701, 702, 703 including at least one heterogeneous processor core.

Each of the processor cores 700, 701, 702, 703 of a processor 604 may be designated a private processor core cache (PPCC) memory 710, 712, 714, 716 that may be dedicated for read and/or write access by a designated processor core 700, 701, 702, 703. The private processor core cache 710, 712, 714, 716 may store data and/or instructions, and make the stored data and/or instructions available to the processor cores 700, 701, 702, 703, to which the private processor core cache 710, 712, 714, 716 is dedicated, for use in execution by the processor cores 700, 701, 702, 703. The private processor core cache 710, 712, 714, 716 may include volatile memory as described herein with reference to memory 606 of FIG. 6.

Groups of the processor cores 700, 701, 702, 703 of a processor 604 may be designated a shared processor core cache (SPCC) memory 720, 722 that may be dedicated for read and/or write access by a designated group of processor core 700, 701, 702, 703. The shared processor core cache 720, 722 may store data and/or instructions, and make the stored data and/or instructions available to the group processor cores 700, 701, 702, 703 to which the shared processor core cache 720, 722 is dedicated, for use in execution by the processor cores 700, 701, 702, 703 in the designated group. The shared processor core cache 720, 722 may include volatile memory as described herein with reference to memory 606 of FIG. 6.

The processor 604 may be include a shared processor cache memory 730 that may be dedicated for read and/or write access by the processor cores 700, 701, 702, 703 of the processor 604. The shared processor cache 730 may store data and/or instructions, and make the stored data and/or instructions available to the processor cores 700, 701, 702, 703, for use in execution by the processor cores 700, 701, 702, 703. The shared processor cache 730 may also function as a buffer for data and/or instructions input to and/or output from the processor 604. The shared cache 730 may include volatile memory as described herein with reference to memory 606 of FIG. 6.

Multiple processors 604 may access a shared system cache memory 740 that may be dedicated for read and/or write access by the processor cores 700, 701, 702, 703 of the multiple processors 604. The shared system cache 740 may store data and/or instructions, and make the stored data and/or instructions available to the processor cores 700, 701, 702, 703, for use in execution by the processor cores 700, 701, 702, 703. The shared system cache 740 may also function as a buffer for data and/or instructions input to and/or output from the multiple processors 604. The shared system cache 740 may include volatile memory as described herein with reference to memory 606 of FIG. 6.

In the example illustrated in FIG. 7, the processor 604 includes four processor cores 700, 701, 702, 703 (i.e., processor core 0, processor core 1, processor core 7, and processor core 3). In the example, each processor core 700, 701, 702, 703 is designated a respective private processor core cache 710, 712, 714, 716 (i.e., processor core 0 and private processor core cache 0, processor core 1 and private processor core cache 1, processor core 7 and private processor core cache 7, and processor core 3 and private processor core cache 3). The processor cores 700, 701, 702, 703 may be grouped, and each group may be designated a shared processor core cache 720, 722 (i.e., a group of processor core 0 and processor core 7 and shared processor core cache 0, and a group of processor core 1 and processor core 3 and shared processor core cache 1). For ease of explanation, the examples herein may refer to the four processor cores 700, 701, 702, 703, the four private processor core caches 710, 712, 714, 716, two groups of processor cores 700, 701, 702, 703, and the shared processor core cache 720, 722 illustrated in FIG. 7. However, the four processor cores 700, 701, 702, 703, the four private processor core caches 710, 712, 714, 716, two groups of processor cores 700, 701, 702, 703, and the shared processor core cache 720, 722 illustrated in FIG. 7 and described herein are merely provided as an example and in no way are meant to limit the various aspects to a four-core processor system with four designated private processor core caches and two designated shared processor core caches 720, 722. The computing device 600, the SoC 602, or the processor 604 may individually or in combination include fewer or more than the four processor cores 700, 701, 702, 703 and private processor core caches 710, 712, 714, 716, and two shared processor core caches 720, 722 illustrated and described herein.

In various aspects, a processor core 700, 701, 702, 703 may access data and/or instructions stored in the shared processor core cache 720, 722, the shared processor cache 730, and/or the shared system cache 740 indirectly through access to data and/or instructions loaded to a higher level cache memory from a lower level cache memory. For example, levels of the various cache memories 710, 712, 714, 716, 720, 722, 730, 740 in descending order from highest level cache memory to lowest level cache memory may be the private processor core cache 710, 712, 714, 716, the shared processor core cache 720, 722, the shared processor cache 730, and the shared system cache 740. In various aspects, data and/or instructions may be loaded to a cache memory 710, 712, 714, 716, 720, 722, 730, 740 from a lower level cache memory and/or other memory (e.g., memory 606, 7 614 in FIG. 6) as a response to a miss the cache memory 710, 712, 714, 716, 720, 722, 730, 740 for a memory access request, and/or as a response to a prefetch operation speculatively retrieving data and/or instructions for future use by the processor core 700, 701, 702, 703. In various aspects, the cache memory 710, 712, 714, 716, 720, 722, 730, 740 may be managed using an eviction policy to replace data and/or instructions stored in the cache memory 710, 712, 714, 716, 720, 722, 730, 740 to allow for storing other data and/or instructions. Evicting data and/or instructions may include writing the evicted data and/or instructions evicted from a higher level cache memory 710, 712, 714, 716, 720, 722, 730 to a lower level cache memory 720, 722, 730, 740 and/or other memory.

For ease of reference, the terms "hardware accelerator," "custom hardware accelerator," "multicore processor," "processor," and "processor core" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers, and may be located and connected differently within the SoC or separate from the SoC.

Figure 8:
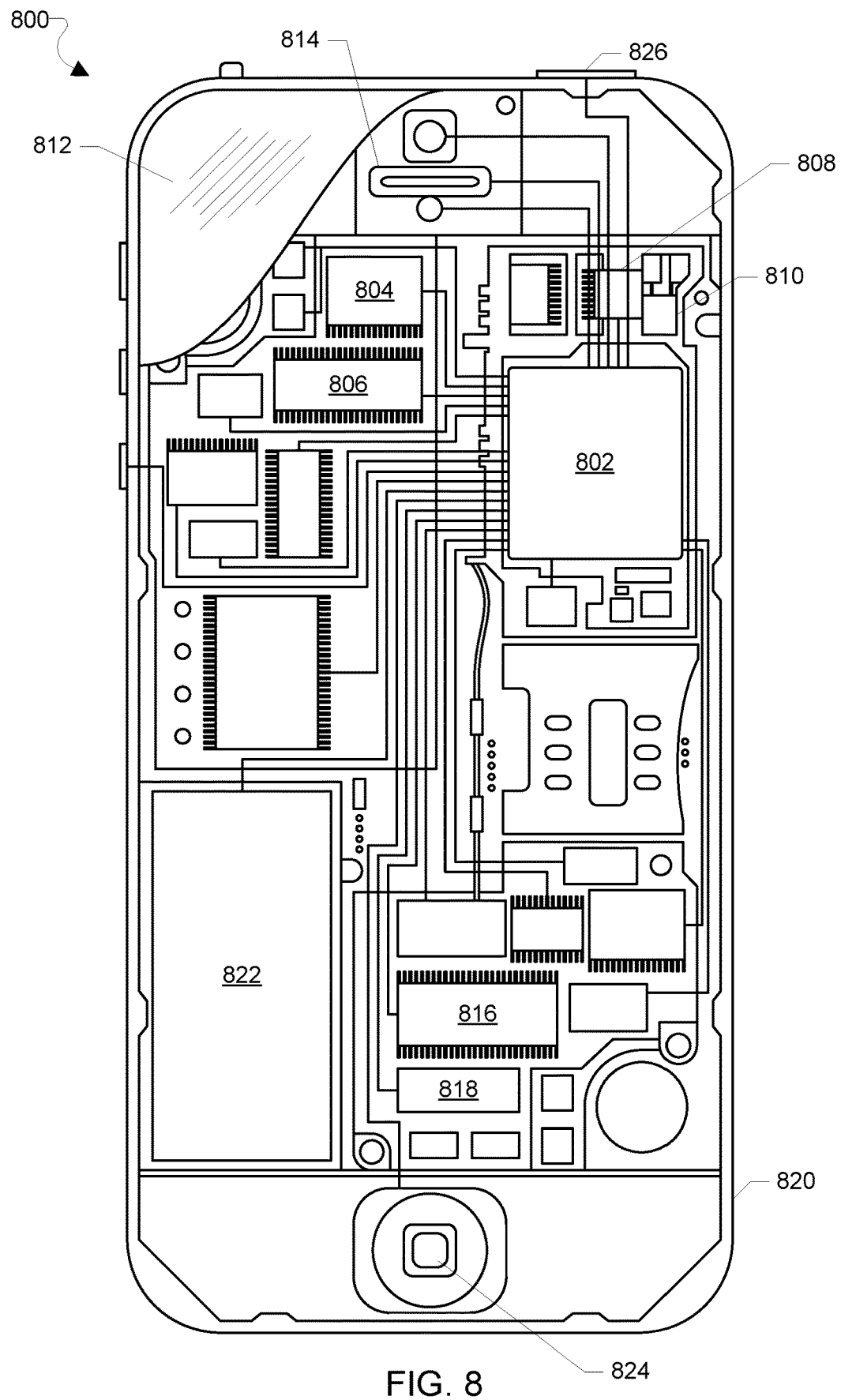
FIG. 8 is a component block diagram illustrating an example mobile computing device suitable for use with the various embodiments.

The various aspects (including, but not limited to, aspects described above with reference to FIGS. 1-7) may be implemented in a wide variety of computing systems including mobile computing devices, an example of which suitable for use with the various aspects is illustrated in FIG. 8. The mobile computing device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the computing device 800 need not have touch screen capability.

The mobile computing device 800 may have one or more radio signal transceivers 808 (e.g., Peanut, Bluetooth, Zig-Bee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as Universal Serial Bus (USB), FireWire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components described herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

Figure 9:
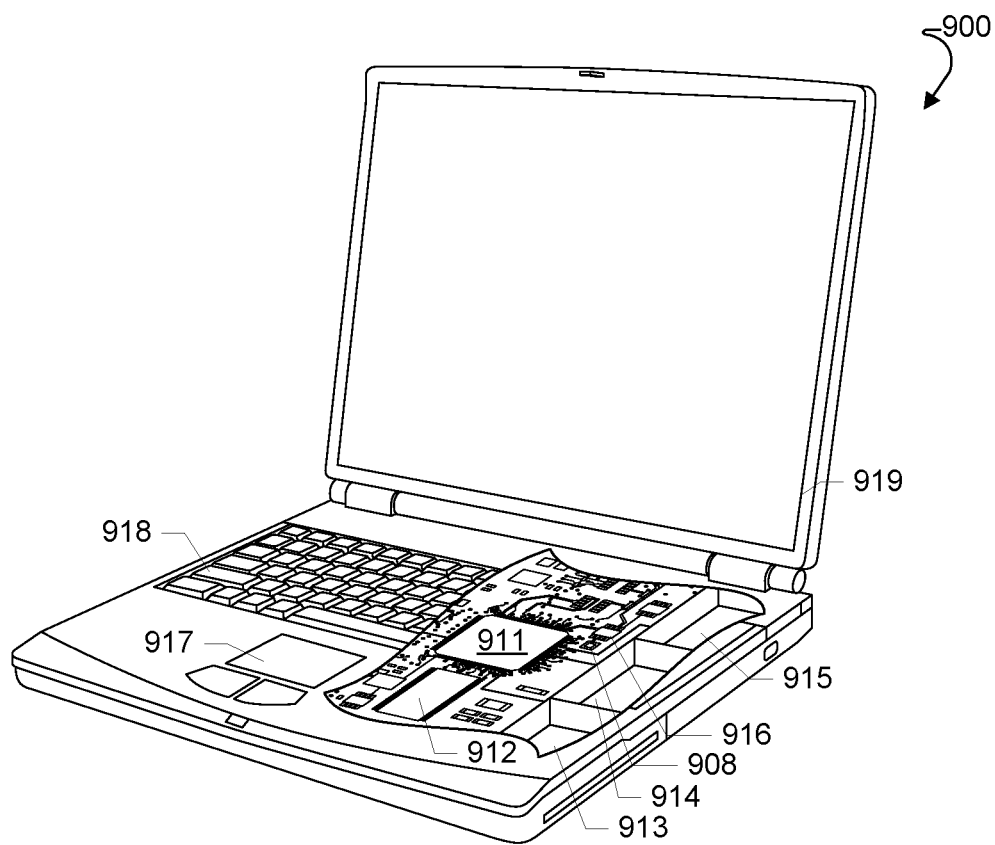
FIG. 9 is a component block diagram illustrating an example mobile computing device suitable for use with the various embodiments.

The various aspects (including, but not limited to, aspects described above with reference to FIGS. 1-7) may be implemented in a wide variety of computing systems include a laptop computer 900 an example of which is illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 911 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 911. The computer 900 may also include a floppy disc drive 914 and a compact disc (CD) drive 915 coupled to the processor 911. In a notebook configuration, the computer housing includes the touchpad 917, the keyboard 918, and the display 919 all coupled to the processor 911. Other configurations of the computing device may include a computer mouse or trackball coupled to the processor (e.g., via a USB input) as are well known, which may also be used in conjunction with the various aspects.

Figure 10:
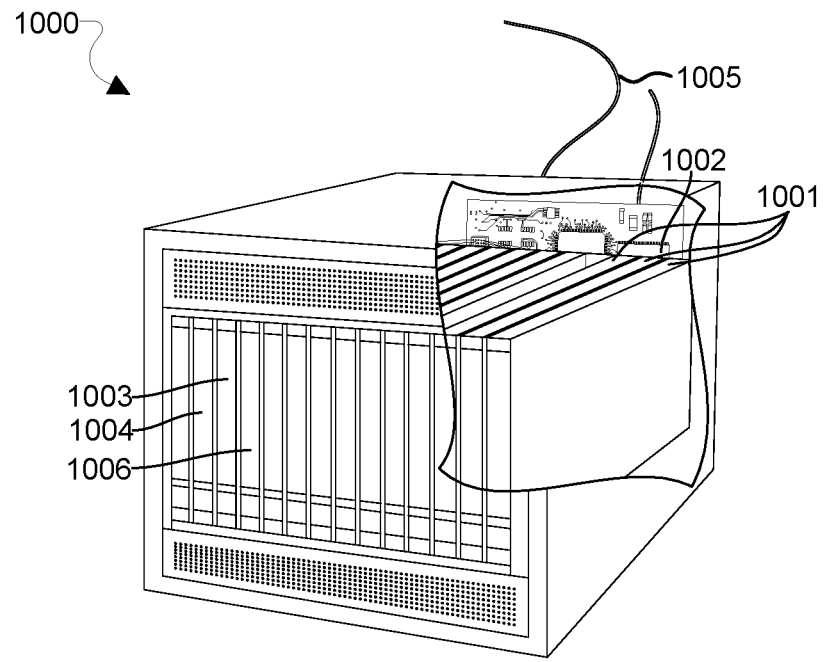
FIG. 10 is a component block diagram illustrating an example server suitable for use with the various embodiments.

The various aspects (including, but not limited to, aspects described above with reference to FIGS. 1-7) may also be implemented in fixed computing systems, such as any of a variety of commercially available servers. An example server 1000 is illustrated in FIG. 10. Such a server 1000 typically includes one or more multicore processor assemblies 1001 coupled to volatile memory 1002 and a large capacity nonvolatile memory, such as a disk drive 1004. As illustrated in FIG. 10, multicore processor assemblies 1001 may be added to the server 1000 by inserting them into the racks of the assembly. The server 1000 may also include a floppy disc drive, compact disc (CD) or digital versatile disc (DVD) disc drive 1006 coupled to the processor 1001. The server 1000 may also include network access ports 1003 coupled to the multicore processor assemblies 1001 for establishing network interface connections with a network 1005, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 11:
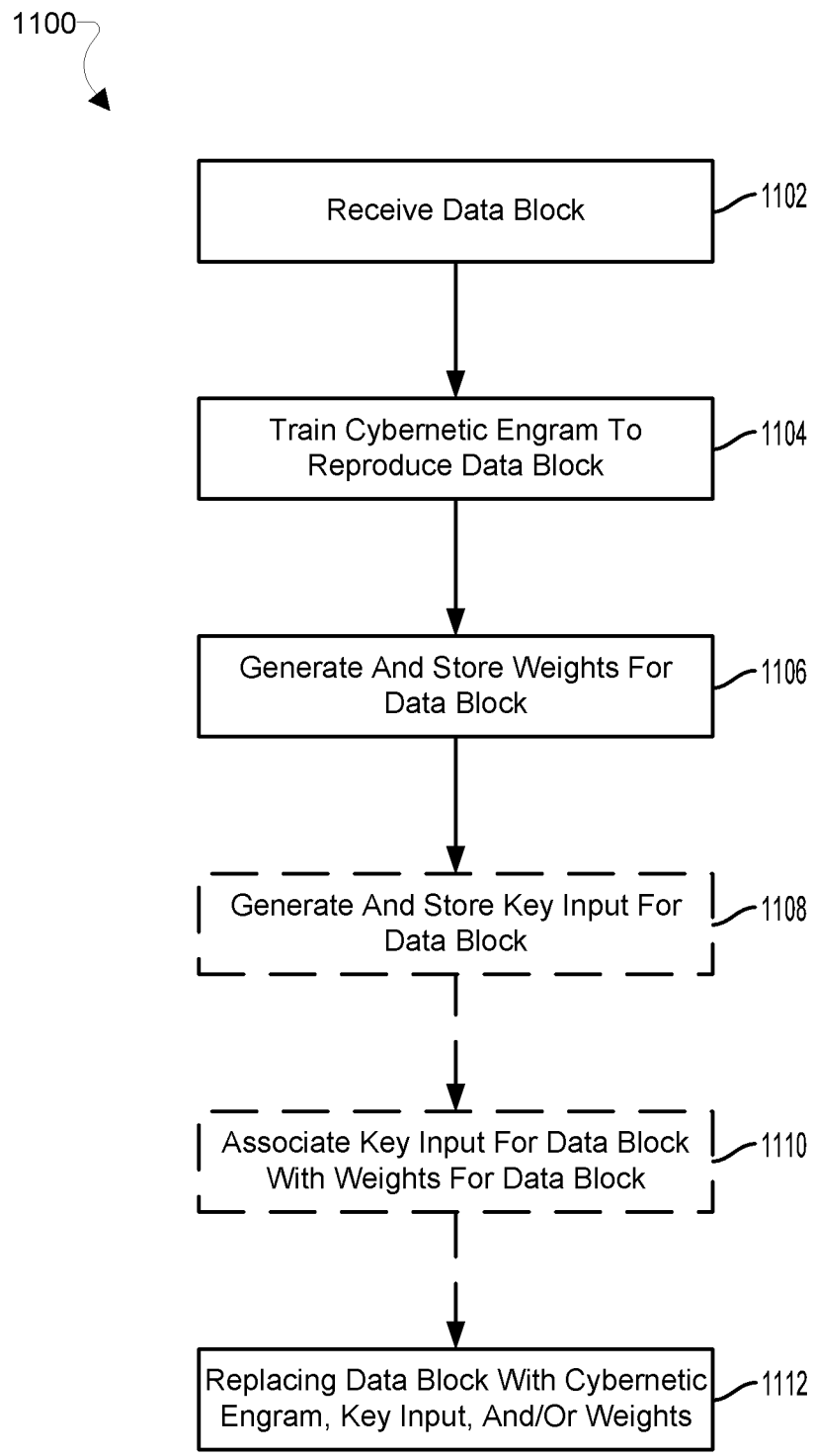
FIG. 11 is a process flow diagram illustrating a method for using a CYBERNETIC ENGRAM® to learn and store a data block according to an embodiment.

FIG. 11 illustrates a method for using a CYBERNETIC ENGRAM® to learn and store a data block according to an embodiment. With reference to FIGS. 1-10, the method 1100 may be implemented in a computing device (e.g., computing device 600 in FIG. 6, mobile computing device 800 in FIG. 8, computing system 900 in FIG. 9, server 1000 in FIG. 10), in software executing in a processor (e.g., CYBERNETIC ENGRAM® 102, 104 in FIGS. 1, 2, 4, and 5, processor 604 in FIGS. 6 and 7, processor 802 in FIG. 8, processor 911 in FIG. 9, and processor assembly 1001 in FIG. 19), in dedicated hardware (e.g., CYBERNETIC ENGRAM® 102, 104 in FIGS. 1, 2, 4, and 5), in general purpose hardware, or in a combination of a software-configured processor and dedicated hardware, such as a processor executing software within a CYBERNETIC ENGRAM® enabled system that includes other individual components, and various memory/cache controllers. In order to encompass the alternative configurations enabled in various embodiments, the hardware implementing the method 1100 is referred to herein as an "CYBERNETIC ENGRAM® device."

In block 1102, the CYBERNETIC ENGRAM® device may receive a data block (e.g., data block 304 in FIGS. 3 and 5). In some embodiments, the data block may be a previously unlearned data block. In other words, the data block may not have been previously processed and learned by a CYBERNETIC ENGRAM® receiving the data block, and there may not be a previously stored key input (e.g., key input 304 in FIGS. 3-5) or weights for the data block, which the CYBERNETIC ENGRAM® may use. In some embodiments, the data block may be a previously learned data block. In other words, the data block may have been previously processed and learned by a CYBERNETIC ENGRAM® receiving the data block, and there may be a previously stored key input and weights for the data block, which the CYBERNETIC ENGRAM® may use.

In block 1104, the CYBERNETIC ENGRAM® device may train a neural network to reproduce the data block. As described herein, the CYBERNETIC ENGRAM® may implement unsupervised learning of the data block. The training of a neural network of the CYBERNETIC ENGRAM® to reproduce the data block may entail determining weights for use by a neural network of the CYBERNETIC ENGRAM® so that the CYBERNETIC ENGRAM® may reproduce the data block from any number or combination of specific inputs, which may include a key input. Training of the neural network of the CYBERNETIC ENGRAM® to reproduce the data block may be a recursive process of: processing an input by a neural network using weights, which at first may be predetermined values; generating an output of a reproduced data block; comparing the reproduced data block and the data block; determining whether the comparison of the reproduced data block and the data block produces an error value that exceeds an error threshold; using the error value to update the weights; and repeating the process until the error value exceeds the error threshold. In some embodiments, the error value that exceeds the error threshold may represent as little as no error measurement from the comparison of the reproduced data block and the data block. Herein, training of a neural network of the CYBERNETIC ENGRAM® to reproduce the data block may also be referred to as the neural network of the CYBERNETIC ENGRAM® learning the data block, and a data block for which the neural network of the CYBERNETIC ENGRAM® has been trained may be referred to a learned data block.

In block 1106, the CYBERNETIC ENGRAM® device may generate and store weights for the data block. The weights may be the weights resulting from training the neural network of the CYBERNETIC ENGRAM® to reproduce the data block, in block 1104, when the error value exceeds the error threshold. In other words, the generated weights may be the last values of the weights used in training the neural network of the CYBERNETIC ENGRAM® to reproduce the data block. These weights may be used by the neural network of the CYBERNETIC ENGRAM® to reproduce the data block to a degree of accuracy controlled by the error threshold. In some embodiments, the degree of accuracy may be up to 100% accurate. The generated weights may be stored by various means. In some embodiments, the weights may be stored in a centralized manner on a computing device. For example, the weights may be stored on any number of combination of memory devices (e.g., memory 606, storage memory 614 in FIG. 6, cache memory 710, 712, 714, 716, 720, 722, 730, 740 in FIG. 7, internal memory 806 in FIG. 8, volatile memory 912, nonvolatile memory 913 in FIG. 9, volatile memory 1002, nonvolatile memory 1004 in FIG. 10) of a computing device. In some embodiments, the weights may be stored in a decentralized or distributed manner across multiple computing devices. For example, the weights may be stored on any number or combination of memory devices across multiple computing devices, such as in distributed ledger, like a blockchain. In some embodiments, the weights may be stored to a memory of the CYBERNETIC ENGRAM® (e.g., neural network memory bank 206 in FIG. 2). In some embodiments, multiple copies of the weights may be stored to multiple local and/or remote memory devices.

In optional block 1108, the CYBERNETIC ENGRAM® device may generate and store a key input for the data block. The key input may be the key input used during training the neural network of the CYBERNETIC ENGRAM® to reproduce the data block in block 1104. The key input may include an operation request, such as read or write, and other parameters, which may include operation request parameters and/or metadata of the data block. In some embodiments, parameters may include as a username, a file owner I.D. matching a process I.D., and/or corresponding permission bits being set. The key input may be stored locally to a memory device of a computing device generating and/or using the key input, and/or to a memory device of a remote computing device accessible to a computing device generating and/or using the key input. In some embodiments, the key inputs may be stored in multiple formats and/or structures, such as a key value store (e.g., key value store 300 in FIG. 3).

In optional block 1110, the CYBERNETIC ENGRAM® device may associate the key input for the data block and weights for the data block. An association of the key input and the weights for the data block may allow the CYBERNETIC ENGRAM® to retrieve the weights for use when receiving a key input, as discussed further herein in the method 1200 with reference to FIG. 12. For example, the key input may include or be stored in a structure that associates the key input with an indication of a location of where the weights are stored. In some embodiments, the indication of the location of where the weights are stored may be the address of where the weights are stored on a memory device. In some embodiments, the indication of where the weights are stored may be a reference to a location of where the weights are stored, such as a pointer to an address in an address table, and/or a reference to a further reference to a location of where the weights are stored, such as a pointer to a hash value in a hash table or tree. In some embodiments, the address or location of the weights may be an address or a reference to a location of the weights stored on a distributed ledger, such as a blockchain.

In block 1112, the CYBERNETIC ENGRAM® device may replace the data block with the neural network of the CYBERNETIC ENGRAM®, the key input, and/or the weights. Replacing the data block may entail deleting, invalidating, overwriting, etc. of the data block while the CYBERNETIC ENGRAM® is implemented and the weights of the data block and, optionally, the key input of the data block are stored in blocks 1106 and 1108. Once the weights and/or the key input for the neural network of the CYBERNETIC ENGRAM® are generated and stored, there may be no need to retain the learned data block, as the CYBERNETIC ENGRAM® may reproduce the learned data block using the weights and the stored and/or generated key input. In some embodiments, the learned data block may be retained for a period of time, for example for testing purposes or offline archiving. But, accesses to the data of the learned data block for operation request may use a reproduced data block, reproduced using the neural network, the key input, and the weights, rather than the learned data block.

Figure 12:
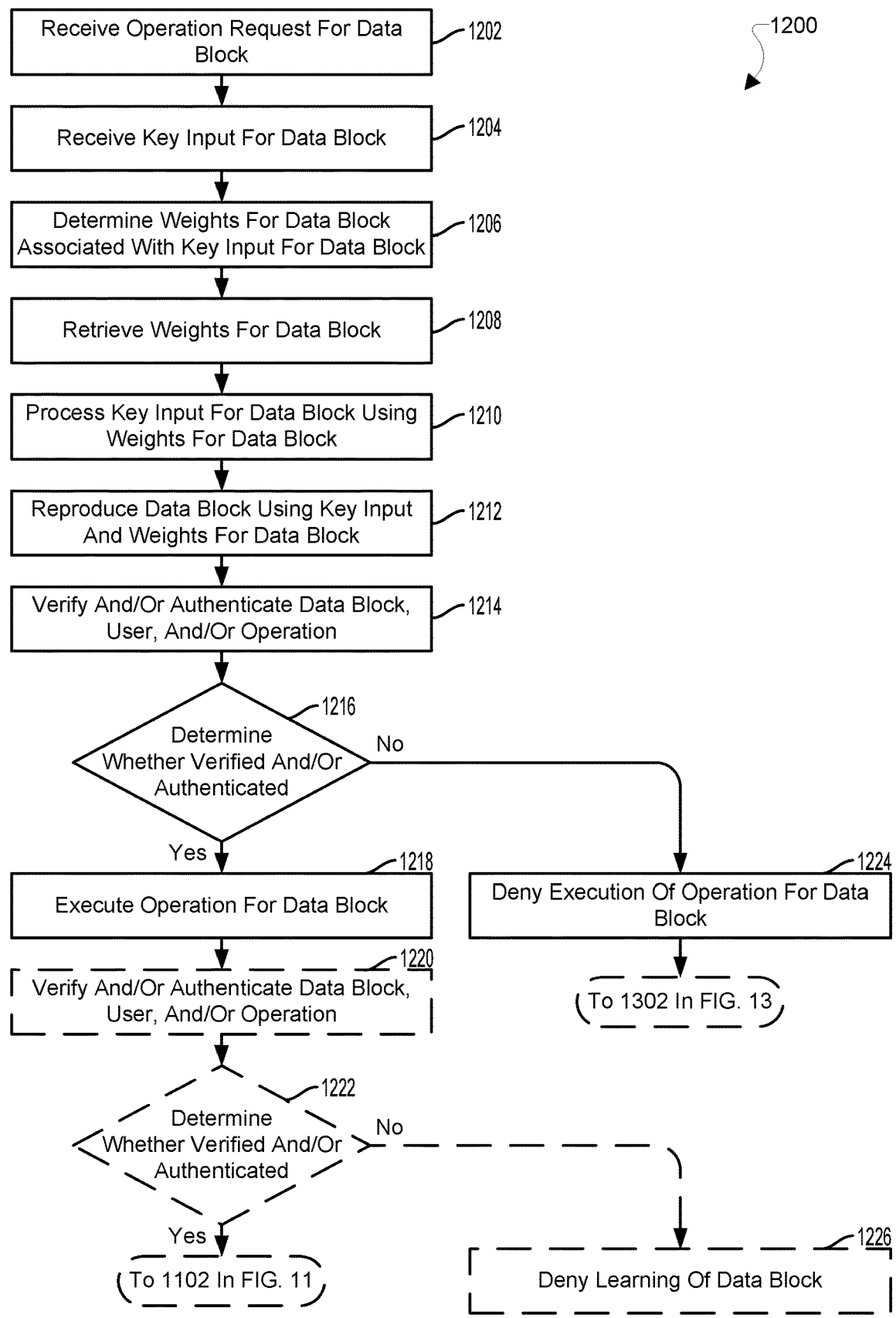
FIG. 12 is a process flow diagram illustrating a method for using a CYBERNETIC ENGRAM® to retrieve and protect a data block according to an embodiment.

FIG. 12 illustrates a method for using a CYBERNETIC ENGRAM® to retrieve and protect a data block according to an embodiment. With reference to FIGS. 1-11, the method 1200 may be implemented in a computing device (e.g., computing device 600 in FIG. 6, mobile computing device 800 in FIG. 8, computing system 900 in FIG. 9, server 1000 in FIG. 10), in software executing in a processor (e.g., CYBERNETIC ENGRAM® 102, 104 in FIGS. 1, 2, 4, and 5, processor 604 in FIGS. 6 and 7, processor 802 in FIG. 8, processor 911 in FIG. 9, and processor assembly 1001 in FIG. 10), in dedicated hardware (e.g., CYBERNETIC ENGRAM® 102, 104 in FIGS. 1, 2, 4, and 5), in general purpose hardware, or in a combination of a software-configured processor and dedicated hardware, such as a processor executing software within a CYBERNETIC ENGRAM® enabled system that includes other individual components, and various memory/cache controllers. In order to encompass the alternative configurations enabled in various embodiments, the hardware implementing the method 1200 is referred to herein as an "CYBERNETIC ENGRAM® device."

In block 1202, the CYBERNETIC ENGRAM® device may receive an operation request for a data block (e.g., data block 302 in FIGS. 3 and 5). For example, operation requests for a data block may include open, close, read, write, execute, etc. In some embodiments the operation request may identify the data block for which to execute the operation request.

In block 1204, the CYBERNETIC ENGRAM® device may receive a key input (e.g., key input 304 in FIGS. 3-5) for the data block. The key input may include the operation request, and other parameters, which may include operation request parameters and/or metadata of the data block. In some embodiments, parameters may include as a username, a file owner I.D. matching a process I.D., and/or corresponding permission bits being set. In some embodiments, the key input corresponding to the data block and the operation request may be retrieved and/or generated and provided to the CYBERNETIC ENGRAM®, for example, by a process or program attempting to access the data block and/or by a process or program configured to generate key inputs for the CYBERNETIC ENGRAM® in response to an operation request for a data block. In some embodiments, the CYBERNETIC ENGRAM® may retrieve and/or generate the key input corresponding to the data block and the operation request. For example, the key input corresponding to the data block and the operation may be stored in a memory device memory devices (e.g., memory 606, storage memory 614 in FIG. 6, cache memory 710, 712, 714, 716, 720, 722, 730, 740 in FIG. 7, internal memory 806 in FIG. 8, volatile memory 912, nonvolatile memory 913 in FIG. 9, volatile memory 1002, nonvolatile memory 1004 in FIG. 10) and retrieved from the memory device. In some embodiments, a partial key input corresponding to the data block may be stored in the memory device, retrieved from the memory device, and combined with the operation request to generate the key input. In some embodiments, the key input may be generated from information provided with the operation and/or from data for the data block, such as metadata, stored on a memory device. In some embodiments, the key input may be generated using a previous history of key input values for the CYBERNETIC ENGRAM®. In some embodiments, the key inputs may be generated using temporal keys, such as timer.

In block 1206, the CYBERNETIC ENGRAM® device may determine weights for the data block associated with the key input for the data block. As described herein, for example in block 1110 of the method 1100 with reference to FIG. 11, the weights for a learned data block may be stored such that an association with the key input allows the weights to be retrieved for use with the key input by the CYBERNETIC ENGRAM®. The association of the key input and the weights may allow the CYBERNETIC ENGRAM® to determine which weights are for use with the key input for the data block. For example, the association may indicate a location of the weights on a local and/or remote memory device. A local memory device may be a memory device of a computing device on which the key input is received and the associated weights are stored. A remote memory device may be a memory device of a computing device remote from the computing device on which the key input is received, such as a remote memory device that is part of a distributed ledger, like a blockchain.

In block 1208, the CYBERNETIC ENGRAM® device may retrieve the weights for the data block. The weights for the data block determined to be associated with the key input for the data block may be retrieved from their storage location, either local or remote, for use in processing the key input for the data block.

In block 1210, the CYBERNETIC ENGRAM® device may process the key input for the data block using the weights for the data block. A neural network of the CYBERNETIC ENGRAM® may use the key input, alone or in combination with other input data, as an input to the neural network. The neural network may process the input, including the key input, through the layers of the neural network while applying the weights to the input and/or activation values generated during the processing by the neural network.

In block 1212, the CYBERNETIC ENGRAM® device may reproduce the data block using the key input for the data block and the weights for the data block. Processing of the key input using the weights by the neural network in block 1210 may ultimately produce an output of the data block. The data block reproduced by the neural network may be a reproduction of the data block learned to reproduced the key input and/or weights, as the learned data block may not have been stored long term since the CYBERNETIC ENGRAM® may be capable of reproducing the learned data block.

In block 1214, the CYBERNETIC ENGRAM® device may verify and/or authenticate the data block, the user, and/or the operation. The CYBERNETIC ENGRAM® may protect the computing device, user, such as a human user, program, and/or process making the operation request for the data block, and/or the data block from attacks, data corruption, unauthorized access, unauthorized processing, etc. Various neural networks of the CYBERNETIC ENGRAM® (e.g., sequencing neural networks 202, verification neural networks 208, authorization neural networks 210 in FIG. 2) may be configured to implement these protections. For example, a verification neural network may be configured to implement principal content analysis, which may verify whether the reproduced data block is what is expected, and not altered via attack or corruption. For further example, an authorization neural network may be configured to implement user and/or process authorization, whereby the authorization neural network may determine whether a user is allowed access to the data block and/or whether a process is allowed to be implemented on the data block. In some embodiments, any number and combination of data block, user, and/or operation verification and/or authentication may be implemented. It may not be necessary to implement any one or combination of data block, user, and/or operation verification and/or authentication in all instances.

In determination block 1216, the CYBERNETIC ENGRAM® device may determine whether the data block, the user, and/or the operation are verified and/or authenticated. Based on the results of the verification and/or authentication in block 1214, the CYBERNETIC ENGRAM® may determine whether the data block, the user, and/or the operation are verified and/or authenticated. The determination of whether the data block, the user, and/or the operation are verified and/or authenticated may be used to control access to and use of the data block by the user and/or the process of the process request. In some embodiments, determination of any number and combination of data block, user, and/or operation verification and/or authentication may be implemented. It may not be necessary to determine any one or combination of data block, user, and/or operation verification and/or authentication in all instances.

In response to determining that the data block, the user, and/or the operation is verified and/or authenticated (i.e., determination block 1216="Yes"), the CYBERNETIC ENGRAM® device may execute the operation of the operation request for the data block in block 1218. The determination that the data block, the user, and/or the operation is verified and/or authenticated may indicate to the CYBERNETIC ENGRAM® that the computing device, such as via a processor, may proceed to implement the operation of the operation request on the data block.

In response to determining that the data block, the user, and/or the operation is not verified and/or authenticated (i.e., determination block 1216="No"), the CYBERNETIC ENGRAM® device may deny execution of the operation of the operation request for the data block in block 1224. The determination that the data block, the user, and/or the operation is not verified and/or authenticated may indicate to the CYBERNETIC ENGRAM® that the computing device, such as via a processor, may not proceed to implement the operation of the operation request on the data block. The CYBERNETIC ENGRAM® device may optionally proceed to retrieve the weights for the data block (e.g., data block 304 in FIGS. 3-5) from a different location than the weights retrieved in block 1208, as described in block 1302 of the method 1300 with reference to FIG. 13.

Following executing the operation of the operation request for the data block in block 1218, in optional block 1220, the CYBERNETIC ENGRAM® device may verify and/or authenticate the data block, the user, and/or the operation. The verification and/or authentication of the data block, the user, and/or the operation may be implemented in manners similar to those described in block 1214. Unlike the verification and/or authentication of the data block, the user, and/or the operation in block 1214, which may be implemented for determining whether to allow operation on the data block; the verification and/or authentication of the data block, the user, and/or the operation in optional block 1220 may be implemented for determining whether to allow a data block that has been operated on to be learned by the CYBERNETIC ENGRAM®. Despite the verification and/or authentication of the data block, the user, and/or the operation in block 1214, the operation on the data block in block 1218 may still corrupt the data block, be an attack on the data block, the user, and/or the operation, and/or result in some unforeseen unauthorized access that may result in unauthorized manipulation of the data block. Therefore, the CYBERNETIC ENGRAM® may again verify and/or authenticate the data block, the user, and/or the operation. In some embodiments, any number and combination of data block, user, and/or operation verification and/or authentication may be implemented. It may not be necessary to implement any one or combination of data block, user, and/or operation verification and/or authentication in all instances.

In optional determination block 1222, the CYBERNETIC ENGRAM® device may determine whether the data block, the user, and/or the operation are verified and/or authenticated. Determination of whether the data block, the user, and/or the operation are verified and/or authenticated may be implemented in manners similar to determination of whether the data block, the user, and/or the operation are verified and/or authenticated in determination block 1216. In some embodiments, determination of any number and combination of data block, user, and/or operation verification and/or authentication may be implemented. It may not be necessary to determine any one or combination of data block, user, and/or operation verification and/or authentication in all instances.

Following execution of the operation of the operation request for the data block in block 1218, or in response to determining that the data block, the user, and/or the operation is verified and/or authenticated (i.e., optional determination block 1222="Yes"), the CYBERNETIC ENGRAM® device may optionally receive the data block as described in block 1102 of the method 1100 with reference to FIG. 11. Some operations on the data block may cause changes to the data block and/or its metadata that should be retained. For example, a write to the data block may change the contents of the data block that may be retained. For further example, a read of the data block may change the metadata of the data block indicating a last access of the data block, which may include a time and/or a user of the access, which may be retained. For a change of the contents of the data block, the weights may need to be retrained so that the CYBERNETIC ENGRAM® may reproduce the data block with the new contents. For a change of the metadata of the data block, in some embodiments, the weights may need to be retained, such as when the metadata may be processed by the CYBERNETIC ENGRAM® and/or when the key input may be updated using the new metadata. In some embodiments, depending on whether the key input is updated, block 1108 may be optional when implementing the method 1100 following implementation of the method 1200.

In response to determining that the data block, the user, and/or the operation is not verified and/or authenticated (i.e., optional determination block 1222="No"), the CYBERNETIC ENGRAM® device may deny learning of the data block in optional block 1226. The determination that the data block, the user, and/or the operation is not verified and/or authenticated may indicate to the CYBERNETIC ENGRAM® not to proceed to learning the data block, as changes to the data block may be undesirable and may not be retained.

Figure 13:
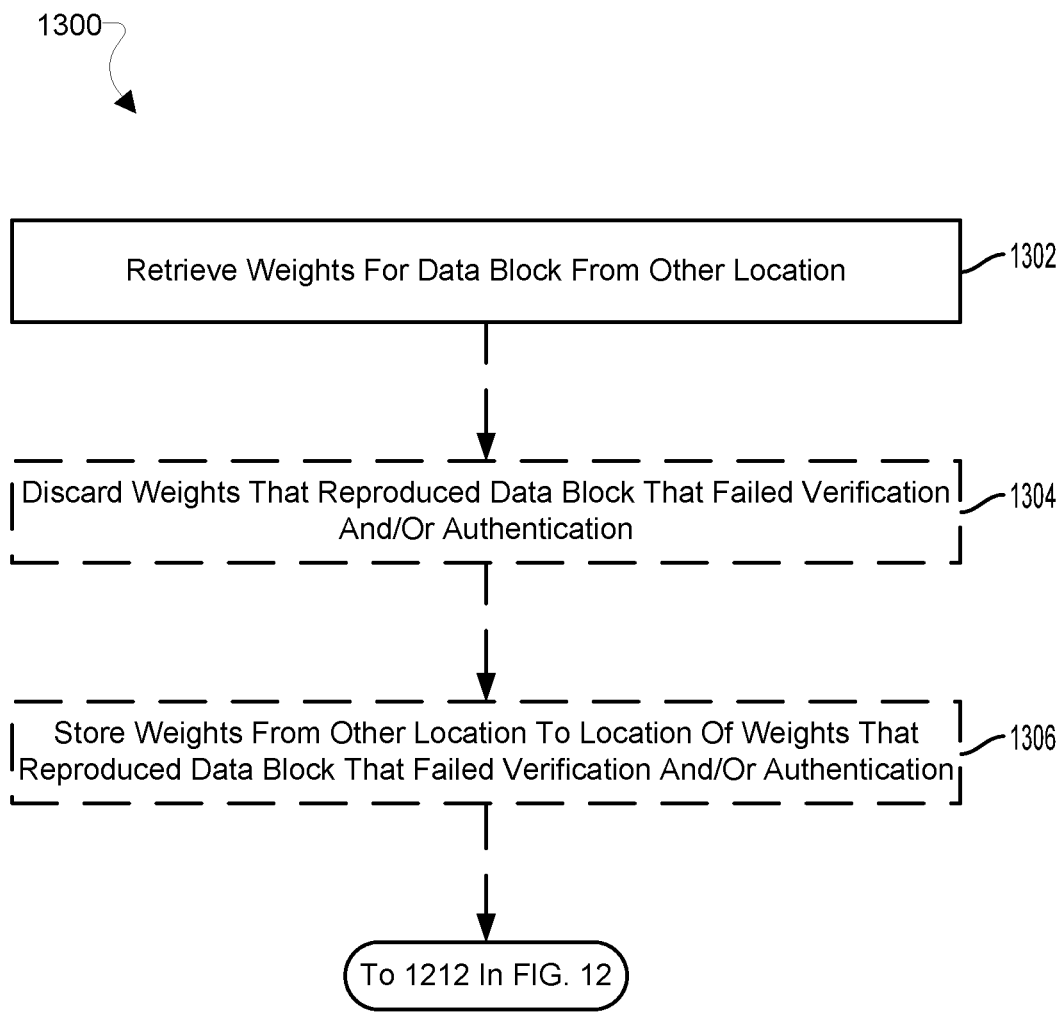
FIG. 13 is a process flow diagram illustrating a method for using a CYBERNETIC ENGRAM® to heal a data block according to an embodiment.

FIG. 13 illustrates a method for using a CYBERNETIC ENGRAM® to heal a data block according to an embodiment. With reference to FIGS. 1-12, the method 1300 may be implemented in a computing device (e.g., computing device 600 in FIG. 6, mobile computing device 800 in FIG. 8, computing system 900 in FIG. 9, server 1000 in FIG. 10), in software executing in a processor (e.g., CYBERNETIC ENGRAM® 102, 104 in FIGS. 1, 2, 4, and 5, processor 604 in FIGS. 6 and 7, processor 802 in FIG. 8, processor 911 in FIG. 9, and processor assembly 1001 in FIG. 19), in dedicated hardware (e.g., CYBERNETIC ENGRAM® 102, 104 in FIGS. 1, 2, 4, and 5), in general purpose hardware, or in a combination of a software-configured processor and dedicated hardware, such as a processor executing software within a CYBERNETIC ENGRAM® enabled system that includes other individual components, and various memory/cache controllers. In order to encompass the alternative configurations enabled in various embodiments, the hardware implementing the method 1300 is referred to herein as an "CYBERNETIC ENGRAM® device."

In block 1302, the CYBERNETIC ENGRAM® device may retrieve the weights for the data block (e.g., data block 304 in FIGS. 3-5) from a different location than the weights retrieved as described in block 1208 of the method 1200 with reference to FIG. 12. Multiple sets of weights for the same data block may be associated with a key input (e.g., key input 302 in FIGS. 3-5) for the data block. To help preserve the integrity of the data of the data block, the various sets of weights may be stored in a distributed manner across multiple memory devices (e.g., memory 606, storage memory 614 in FIG. 6, cache memory 710, 712, 714, 716, 720, 722, 730, 740 in FIG. 7, internal memory 806 in FIG. 8, volatile memory 912, nonvolatile memory 913 in FIG. 9, volatile memory 1002, nonvolatile memory 1004 in FIG. 10) of multiple computing devices. In some embodiments, the various sets of weights may be ordered or ranked for the purpose of determining which set of weights to retrieve in response to a set of weights reproducing a data block that fails to be validated and/or authenticated as described herein in block 1214 and determination block 1216 in the method 1200 with reference to FIG. 12. In some embodiment, the order or rank may represent a confidence that the set of weights may faithfully reproduce the data block. The weights for the data block determined to be associated with the key input for the data block may be retrieved from their storage location, either local or remote, for use in processing the key input for the data block.

In optional block 1304, the CYBERNETIC ENGRAM® device may discard the weights that reproduce a data block that fails to be validated and/or authenticated. Discarding the weights may entail deleting, invalidating, overwriting, etc. of the weights in the memory device on which the weights are stored. In some embodiments, the weights may persist on the memory device to which the weights are stored, but may be ranked or ordered in a manner that reduces the confidence that the weights may faithfully reproduce the data block. The weights may be retained for posterity, analysis of why the weights reproduce a data block that fails to be validated and/or authenticated, version tracking, etc.

In optional block 1306, CYBERNETIC ENGRAM® device may store weights from a different location to the location of the weights that reproduce a data block that fails to be validated and/or authenticated. In some embodiments, the weights that are retrieved in block 1302 may be stored to the location of the weights that reproduce a data block that fails to be validated and/or authenticated.

Following retrieve the weights in block 1302, discarding the weights in optional block 1304, or storing the weights in block 1306, the CYBERNETIC ENGRAM® device may proceed to reproduce the data block using the key input for the data block and the weights for the data block retrieved in block 1302, as described in block 1212 of the method 1200 with reference to FIG. 12.

Computer program code or "program code" for execution on a programmable processor for carrying out operations of the various aspects may be written in a high level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of transforming at least one data block into weights for at least one neural network, comprising:
   training at least one sequencing neural network of a collection of neural networks and logic gates configured as primitive functions to reproduce the at least one data block by creating a sequence of the logic gates specifically for the at least one data block on which the at least one sequencing neural network is trained and configured to reproduce the at least one data block based on inputs including the weights; and
   replacing the at least one data block in memory with weights used by the at least one sequencing neural network to reproduce the at least one data block by implementing the sequence of the logic gates configured to reproduce the at least one data block based on the inputs including the weights.

2. The method of claim 1, further comprising:
receiving an operation request for the at least one data block;
receiving a key input configured to trigger the at least one sequencing neural network to reproduce the at least one data block; and
reproducing the at least one data block using the at least one sequencing neural network, the weights, and the key input in response to receiving the operation request.

3. The method of claim 1, further comprising:
reproducing the at least one data block using the at least one sequencing neural network, the weights, and a key input configured to trigger the at least one sequencing neural network to reproduce the at least one data block, resulting in at least one reproduced data block; and
executing an operation of an operation request for the at least one data block on the at least one reproduced data block.

4. The method of claim 3, further comprising executing verification for the at least one reproduced data block by a verification neural network of the collection of neural networks and logic gates configured as primitive functions, wherein executing an operation of an operation request for the at least one data block on the at least one reproduced data block occurs in response to verification for the at least one reproduced data block.

5. The method of claim 3, further comprising executing authentication for the at least one reproduced data block by a verification neural network of the collection of neural networks and logic gates configured as primitive functions, wherein executing an operation of an operation request for the at least one data block on the at least one reproduced data block occurs in response to authentication for the re at least one produced data block.

6. The method of claim 1, further comprising:
reproducing the at least one data block using the at least one sequencing neural network, the weights, and a key input configured to trigger the at least one sequencing neural network to reproduce the at least one data block, resulting in at least one reproduced data block;
executing verification for the at least one reproduced data block by a verification neural network of the collection of neural networks and logic gates configured as primitive functions;
retrieving different weights in response to failure to verify the at least one reproduced data block; and
reproducing the at least one data block using the at least one sequencing neural network, the different weights, and the key input, resulting in at least one reproduced data block.

7. The method of claim 1, wherein replacing the at least one data block in memory with weights used by the at least one sequencing neural network to reproduce the at least one data block comprises storing the weights to a distributed ledger.

8. A computing device, comprising a processor configured with processor-executable instructions for causing the processor to implement operations comprising:
   training at least one sequencing neural network of a collection of neural networks and logic gates configured as primitive functions to reproduce at least one data block by creating a sequence of the logic gates specifically for the at least one data block on which the at least one sequencing neural network is trained and configured to reproduce the data based on inputs including the weights; and
   replacing the at least one data block in memory with weights used by the at least one sequencing neural network to reproduce the at least one data block by implementing the sequence of the logic gates configured to reproduce the data based on the inputs including the weights.

9. The computing device of claim 8, wherein the processor is configured with processor-executable instructions for causing the processor to implement operations further comprising:
   receiving an operation request for the at least one data block;
   receiving a key input configured to trigger the at least one sequencing neural network to reproduce the at least one data block; and
   reproducing the at least one data block using the at least one sequencing neural network, the weights, and the key input in response to receiving the operation request.

10. The computing device of claim 8, wherein the processor is configured with processor-executable instructions for causing the processor to implement operations further comprising:
  reproducing the at least one data block using the at least one sequencing neural network, the weights, and a key input configured to trigger the at least one sequencing neural network to reproduce the at least one data block, resulting in at least one reproduced data block; and
  executing an operation of an operation request for the at least one data block on the at least one reproduced data block.

11. The computing device of claim 10, wherein the processor is configured with processor-executable instructions for causing the processor to implement operations further comprising executing verification for the at least one reproduced data block by a verification neural network of the collection of neural networks and logic gates configured as primitive functions, wherein executing an operation of an operation request for the at least one data block on the at least one reproduced data block occurs in response to verification for the at least one reproduced data block.

12. The computing device of claim 10, wherein the processor is configured with processor-executable instructions for causing the processor to implement operations further comprising executing authentication for the at least one reproduced data block by a verification neural network of the collection of neural networks and logic gates configured as primitive functions, wherein executing an operation of an operation request for the at least one data block on the at least one reproduced data block occurs in response to authentication for the at least one reproduced data block.

13. The computing device of claim 8, wherein the processor is configured with processor-executable instructions for causing the processor to implement operations further comprising:
  reproducing the at least one data block using the at least one sequencing neural network, the weights, and a key input configured to trigger the at least one sequencing neural network to reproduce the at least one data block, resulting in at least one reproduced data block;
  executing verification for the at least one reproduced data block by a verification neural network of the collection of neural networks and logic gates configured as primitive functions;
  retrieving different weights in response to failure to verify the at least one reproduced data block; and
  reproducing the at least one data block using the at least one sequencing neural network, the different weights, and the key input, resulting in at least one reproduced data block.

14. The computing device of claim 8, wherein the processor is configured with processor-executable instructions for causing the processor to implement operations such that replacing the at least one data block in memory with weights used by the at least one sequencing neural network to reproduce the at least one data block comprises storing the weights to a distributed ledger.

15. A non-transitory, processor-readable medium having stored thereon processor-executable instructions configured to cause a processor to perform operations comprising:
  training at least one sequencing neural network of a collection of neural networks and logic gates configured as primitive functions to reproduce a at least one data block by creating a sequence of the logic gates specifically for the at least one data block on which the at least one sequencing neural network is trained and configured to reproduce the data based on inputs including the weights; and
  replacing the at least one data block in memory with weights used by the at least one sequencing neural network to reproduce the at least one data block by implementing the sequence of the logic gates configured to reproduce the data based on the inputs including the weights.

16. The non-transitory, processor-readable medium of claim 15, wherein the stored processor-executable instructions are configured to cause the processor to perform operations further comprising:
  receiving an operation request for the at least one data block;
  receiving a key input configured to trigger the at least one sequencing neural network to reproduce the at least one data block; and
  reproducing the at least one data block using the at least one sequencing neural network, the weights, and the key input in response to receiving the operation request.

17. The non-transitory, processor-readable medium of claim 15, wherein the stored processor-executable instructions are configured to cause the processor to perform operations further comprising:
  reproducing the at least one data block using the at least one sequencing neural network, the weights, and a key input configured to trigger the at least one sequencing neural network to reproduce the at least one data block, resulting in at least one reproduced data block; and
  executing an operation of an operation request for the at least one data block on the at least one reproduced data block.

18. The non-transitory, processor-readable medium of claim 17, wherein the stored processor-executable instructions are configured to cause the processor to perform operations further comprising executing verification for the at least one reproduced data block by a verification neural network of the collection of neural networks and logic gates configured as primitive functions, wherein executing an operation of an operation request for the at least one data block on the at least one reproduced data block occurs in response to verification for the at least one reproduced data block.

19. The non-transitory, processor-readable medium of claim 17, wherein the stored processor-executable instructions are configured to cause the processor to perform operations further comprising executing authentication for the at least one reproduced data block by a verification neural network of the collection of neural networks and logic gates configured as primitive functions, wherein executing an operation of an operation request for the at least one data block on the at least one reproduced data block occurs in response to authentication for the at least one reproduced data block.

20. The non-transitory, processor-readable medium of claim 15, wherein the stored processor-executable instructions are configured to cause the processor to perform operations such that replacing the at least one data block in memory with weights used by the at least one sequencing neural network to reproduce the at least one data block comprises storing the weights to a distributed ledger, and
  wherein the stored processor-executable instructions are configured to cause the processor to perform operations further comprising:

reproducing the at least one data block using the at least one sequencing neural network, the weights, and a key input configured to trigger the at least one sequencing neural network to reproduce the at least one data block, resulting in at least one reproduced data block;

executing verification for the at least one reproduced data block by a verification neural network of the collection of neural networks and logic gates configured as primitive functions;

retrieving different weights in response to failure to verify the at least one reproduced data block; and reproducing the at least one data block using the at least one sequencing neural network, the different weights, and the key input, resulting in at least one reproduced data block.

* * * * *